United States Patent
Park et al.

(10) Patent No.: US 11,210,232 B2
(45) Date of Patent: Dec. 28, 2021

(54) PROCESSOR TO DETECT REDUNDANCY OF PAGE TABLE WALK

(71) Applicant: SAMSUNG ELECTRONICS CO., LTD., Suwon-si (KR)

(72) Inventors: Sung-Boem Park, Seoul (KR); Moinul Syed, Austin, TX (US); Ju-Hee Choi, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 187 days.

(21) Appl. No.: 16/562,011

(22) Filed: Sep. 5, 2019

(65) Prior Publication Data

US 2020/0257635 A1  Aug. 13, 2020

Related U.S. Application Data

(60) Provisional application No. 62/803,227, filed on Feb. 8, 2019.

(30) Foreign Application Priority Data

Feb. 26, 2019 (KR) .................. 10-2019-0022184

(51) Int. Cl.
*G06F 12/00* (2006.01)
*G06F 12/1009* (2016.01)
*G06F 12/0873* (2016.01)
*G06F 12/1027* (2016.01)

(52) U.S. Cl.
CPC ...... *G06F 12/1009* (2013.01); *G06F 12/0873* (2013.01); *G06F 12/1027* (2013.01); *G06F 2212/1021* (2013.01)

(58) Field of Classification Search
None
See application file for complete search history.

(56) References Cited

U.S. PATENT DOCUMENTS

| | | | |
|---|---|---|---|
| 7,133,968 B2 | 11/2006 | Gaskins et al. | |
| 8,225,071 B2 | 7/2012 | Chen et al. | |
| 8,984,255 B2 | 3/2015 | Hsu et al. | |
| 9,092,358 B2 | 7/2015 | Rychlik et al. | |
| 9,213,649 B2 | 12/2015 | Koka et al. | |
| 9,235,529 B2 | 1/2016 | Koka et al. | |
| 9,405,702 B2 * | 8/2016 | Mukherjee | G06F 12/0833 |
| 2013/0326143 A1 | 12/2013 | Chen | |
| 2014/0156930 A1 * | 6/2014 | Isloorkar | G06F 12/1027 |
| | | | 711/122 |
| 2016/0179662 A1 | 6/2016 | Keppel et al. | |
| 2016/0378684 A1 | 12/2016 | Zmudzinski et al. | |
| 2017/0084000 A1 | 3/2017 | Seiler | |
| 2017/0185528 A1 | 6/2017 | Hansson et al. | |

* cited by examiner

*Primary Examiner* — Daniel D Tsui
(74) *Attorney, Agent, or Firm* — Volentine, Whitt & Francos, PLLC

(57) ABSTRACT

A processor includes a page table walk cache that stores address translation information, and a page table walker. The page table walker fetches first output addresses indicated by first indexes of a first input address by looking up the address translation information and at least a part of page tables, and compares a matching level between second indexes of a second input address and the first indexes of the first input address with a walk cache hit level obtained by looking up the page table walk cache using the second indexes.

17 Claims, 15 Drawing Sheets

PROCESSOR TO DETECT REDUNDANCY OF PAGE TABLE WALK

CROSS-REFERENCE TO RELATED APPLICATIONS

This U.S. non-provisional patent application claims the benefit of priority under 35 U.S.C. § 120 to U.S. Provisional Patent Application No. 62/803,227, filed on Feb. 8, 2019 in the U.S. Patent and Trademark Office, and the benefit of priority under 35 U.S.C. § 119 to Korean Patent Application No. 10-2019-0022184, filed on Feb. 26, 2019 in the Korean Intellectual Property Office, the disclosures of which are incorporated by reference herein in their entireties.

BACKGROUND

1. Technical Field

The present disclosure relates to a processor, and more particularly, relates to a processor configured to detect a redundancy of a page table walk.

2. Description of the Related Art

A system on chip (hereinafter referred to as a "SoC") is an integrated circuit in which multiple components of an electronic system or multiple intellectual properties (IPs) are integrated. The term "intellectual properties" and the acronym "IPs" both reference unique circuits and components of circuits that may each be separately subject to intellectual property protection. The term and the acronym may be synonymous with similar terms such as "IP block" or "IP circuit" when used in the descriptions herein. A processor of the SoC may execute multiple application programs wanted by a user and, to this end, the processor may exchange data with a memory device. However, since the user wants to execute multiple application programs quickly and simultaneously, it is necessary for the processor to efficiently use a restricted resource of a memory device. The processor may use a virtual memory space and may manage a page table by functions including mapping information between the virtual memory space and a physical memory space of the memory device. The processor may look up the page table and may perform translation between a virtual address of the virtual memory space and a physical address of the physical memory space.

SUMMARY

Embodiments of the present disclosure provide a processor to detect a redundancy of a page table walk.

According to an exemplary embodiment, a processor includes a page table walk cache and a page table walker. The page table walk cache stores address translation information. The page table walker fetches first output addresses indicated by first indexes of a first input address by looking up the address translation information and at least a part of page tables. The page table walker also compares a matching level with a walk cache hit level. The matching level is between second indexes of a second input address and the first indexes of the first input address. The walk cache hit level is obtained by looking up the page table walk cache using the second indexes.

According to another exemplary embodiment, a processor includes a page table walk cache and a page table walker. The page table walk cache stores address translation information. The page table walker fetches first intermediate addresses indicated by first indexes of the first input address by looking up the address translation information and at least a part of first page tables of a first stage. The page table walker also fetches first output addresses indicated by second indexes of each of the first intermediate addresses by looking up the address translation information and at least a part of second page tables of a second stage. The page table walker moreover compares a matching level with a walk cache hit level. The matching level is between fourth indexes of each of second intermediate addresses indicated by third indexes of a second input address and the second indexes of each of the first intermediate addresses. The walk cache hit level is obtained by looking up the page table walk cache using the fourth indexes.

According to yet another exemplary embodiment, a processor includes a page table walk cache and a page table walker. The page table walk cache stores address translation information. The page table walker fetches first intermediate addresses indicated by first indexes of the first input address by looking up the address translation information and at least a part of first page tables of a first stage. The page table walker also fetches first output addresses indicated by second indexes of each of the first intermediate addresses by looking up the address translation information and at least a part of second page tables of a second stage. The page table walker moreover compares a first matching level with a first walk cache hit level. The first matching level is between third indexes of a second input address and the first indexes of the first input address. The first walk cache hit level is obtained by looking up the page table walk cache using the third indexes. The page table walker furthermore compares a second matching level with a second walk cache hit level. The second matching level is between fourth indexes of each of second intermediate addresses indicated by the third indexes of the second input address and the second indexes of each of the first intermediate addresses. The second walk cache hit level is obtained by looking up the page table walk cache using the fourth indexes.

DETAILED DESCRIPTION

Figure 1:
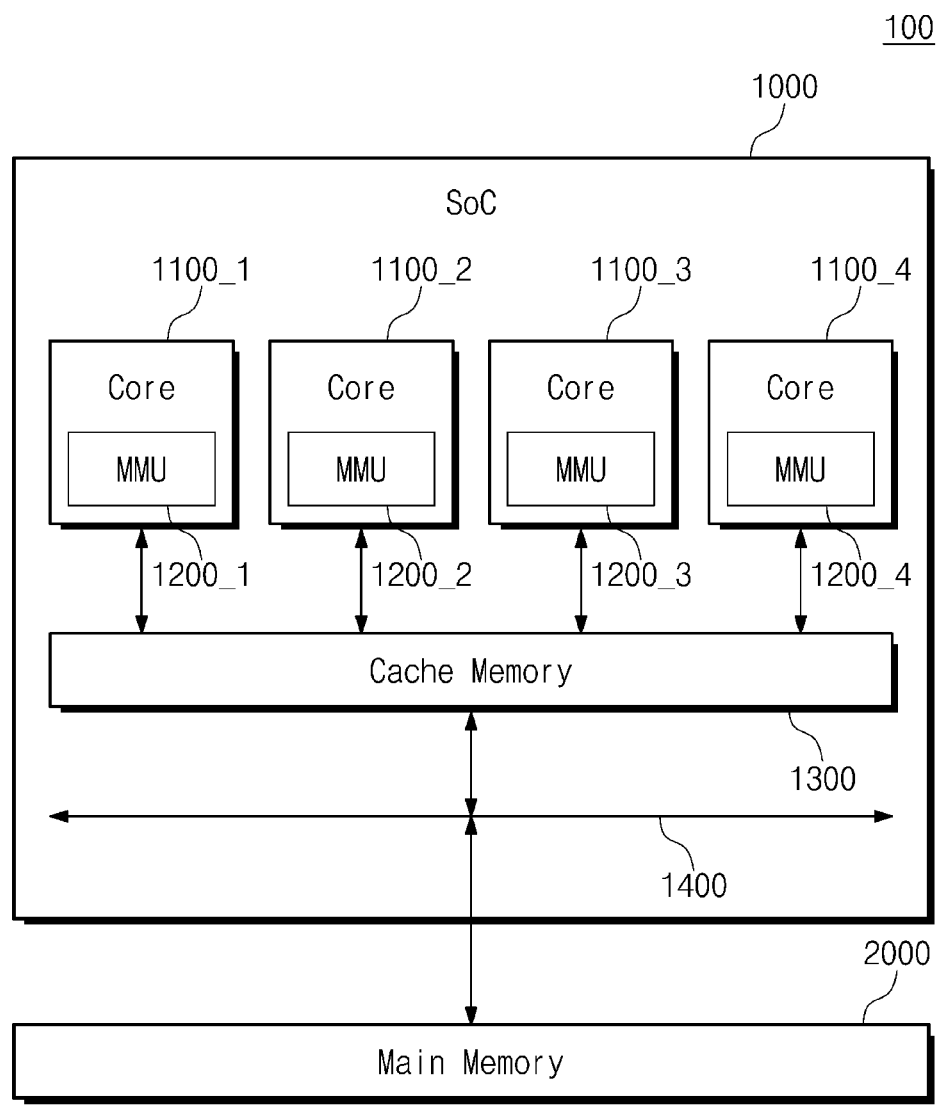
FIG. 1 illustrates a block diagram of an electronic device according to an embodiment of the present disclosure.

FIG. 1 illustrates a block diagram of an electronic device according to an embodiment of the present disclosure. An electronic device 100 may include a SoC 1000 (system on chip) and a main memory 2000. The electronic device 100 may be also referred to as an "electronic system". For example, the electronic device 100 may be a desktop computer, a laptop computer, a workstation, a server, a mobile device, etc. A SoC 1000 may be one chip into which various (multiple different) systems are integrated, such as on a single integrated substrate and/or such as within an integrated housing.

The SoC 1000 may control overall operations of the electronic device 100, as an application processor (AP). The SoC 1000 may include first core 1100_1 to fourth core 1100_4 (each may also be referred to as a "processor" or a "central processing unit (CPU)"), a cache memory 1300, and a bus 1400. Although not illustrated in drawings, the SoC 1000 may further include any other intellectual property (IP) such as a memory controller. Each of the first core 1100_1 to fourth core 1100_4 may execute various software such as an application program, an operating system, and/or a device driver. The number of the first core 1100_1 to fourth core 1100_4 of FIG. 1 is only an example, and the SoC 1000 may include one or more homogeneous or heterogeneous cores.

The first core 1100_1 to fourth core 1100_4 may include a first MMU 1200_1 (memory management unit) to a fourth MMU 1200_4, respectively. The first MMU 1200_1 to fourth MMU 1200_4 may translate virtual addresses which are used into physical addresses that are used in a hardware memory device such as the cache memory 1300 in the SoC 1000, the main memory 2000 outside the SoC 1000, and/or an auxiliary memory (not illustrated) outside the SoC 1000. The first MMU 1200_1 to fourth MMU 1200_4 may translate the virtual addresses into the physical addresses as first software to fourth software is executed by the first core 1100_1 to the fourth core 1100_4, respectively. The first MMU 1200_1 to fourth MMU 1200_4 may manage address translation information (e.g., a translation table) between virtual addresses and physical addresses. The first MMU 1200_1 to fourth MMU 1200_4 may allow application programs to have private (dedicated) virtual memory spaces and may allow the first core 1100_1 to fourth core 1100_4 to execute multiple tasks.

The cache memory 1300 may be respectively connected to the first core 1100_1 to fourth core 1100_4 and may be shared by the first core 1100_1 to fourth core 1100_4. For example, the cache memory 1300 may be implemented by using a register, a flip-flop, a static random access memory (SRAM), or a combination thereof. The cache memory 1300 may have a faster access speed than the main memory 2000 for the first core 1100_1 to the fourth core 1100_4. The cache memory 1300 may store instructions, data, addresses, address translation information, etc., for and/or associated with the first core 1100_1 to fourth core 1100_4.

The bus 1400 may connect internal IPs of the SoC 1000 such as the cores 1100_1 to 1100_4, the cache memory 1300, etc., or may provide an access path for the internal IPs of the SoC 1000 to the main memory 2000. The bus 1400 may be an AMBA (Advanced Microcontroller Bus Architecture) standard bus protocol type. The bus type of the AMBA may be an AHB (Advanced High-Performance Bus), an APB (Advanced Peripheral Bus), or an AXI (Advanced eXtensible Interface).

The main memory 2000 may communicate with the SoC 1000. The main memory 2000 may provide the first core 1100_1 to fourth core 1100_4 with a larger capacity than the cache memory 1300. The main memory 2000 may store instructions, data, addresses, address translation information, etc. provided from the SoC 1000. For example, the main memory 2000 may be a dynamic random access memory (DRAM). In an embodiment, the electronic device 100 may further include any other hardware memory device (not illustrated) which communicates with the SoC 1000, such as a solid state drive (SSD), a hard disk drive (HDD), or a memory card, in addition to the main memory 2000.

Figure 2:
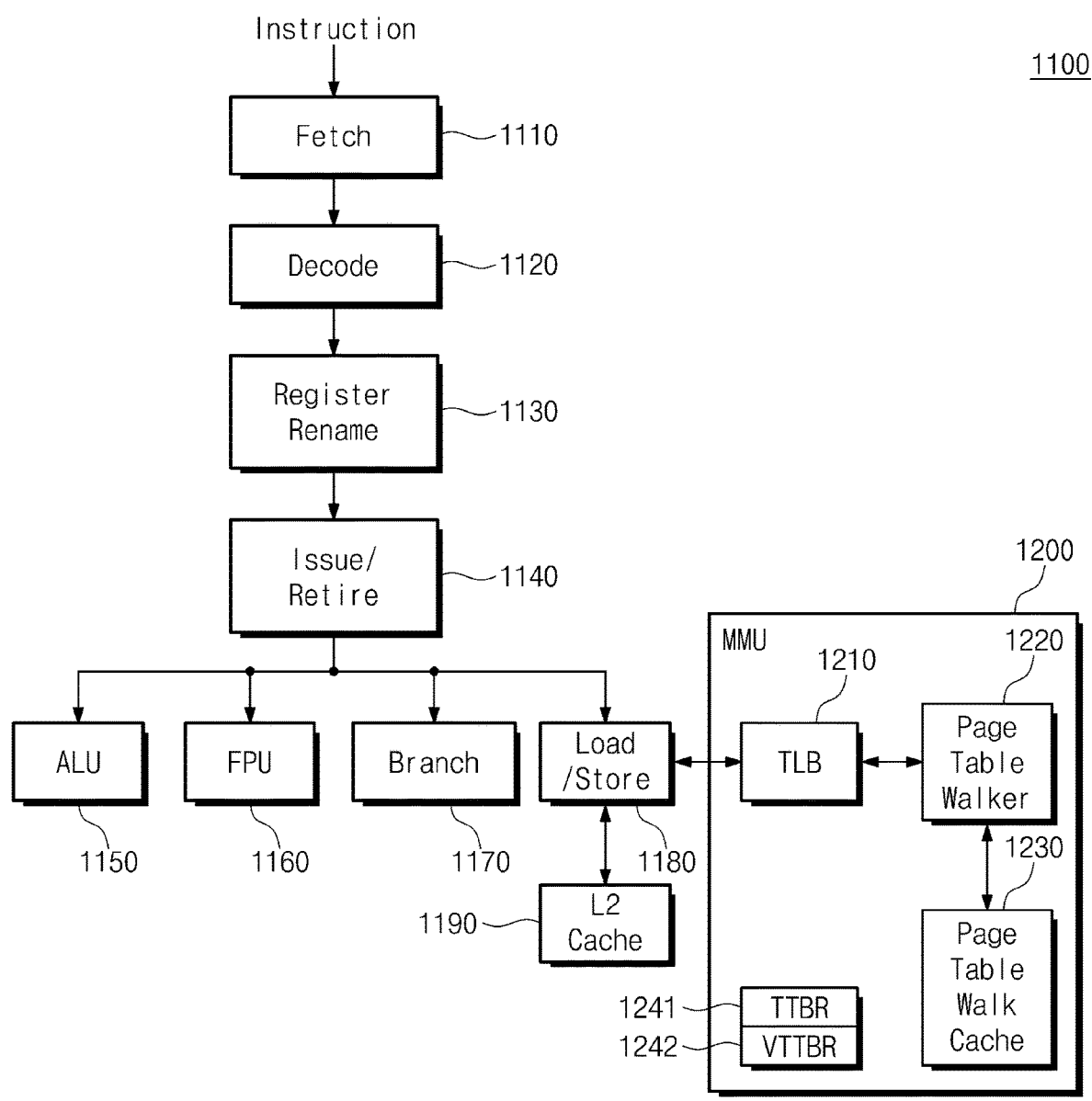
FIG. 2 illustrates a block diagram of any one of a first core to a fourth core in a SoC of FIG. 1.

FIG. 2 illustrates a block diagram of any one of a first core to a fourth core in a SoC of FIG. 1. A core 1100 may be any one of the first core 1100_1 to fourth core 1100_4 of FIG. 1. The core 1100 may include a fetch unit 1110, a decode unit 1120, a register rename unit 1130, an issue/retire unit 1140, an ALU 1150 (arithmetic logic unit), a FPU 1160 (floating-point unit), a branch check unit 1170, a load/store unit 1180, an L2 cache 1190, and an MMU 1200. All components of the core 1100 including detailed components of the MMU 1200 may be implemented with hardware by using an analog circuit, a digital circuit, a logic circuit, a clock circuit, a flip-flop, a register, etc.

The fetch unit 1110 may fetch an instruction with reference to a memory address stored in a program counter (not illustrated) that traces the memory address of the instruction and may store the fetched instruction in an instruction register (not illustrated). For example, the instruction may be stored in a memory such as a cache memory (not illustrated) in the core 1100, the cache memory 1300, or the main memory 2000. The decode unit 1120 may decode the instruction stored in the instruction register and may determine what instruction is to be executed so as to cause the instruction to be executed. The register rename unit 1130 may map logical registers designated by the instruction into physical registers in the core 1100. The register rename unit 1130 may map logical registers designated by continuous instructions into different physical registers and may remove dependence between the instructions. The issue/retire unit 1140 may control when a decoded instruction is issued (or dispatched) to pipelines and when returned results are retired.

The ALU 1150 may perform an arithmetic operation, a logical operation, or a shift operation based on the dispatched instructions. The ALU 1150 may be provided with an operation code, an operand, etc. necessary for an operation from a memory. The FPU 1160 may perform a floating-point operation. The branch check unit 1170 may check that a branch direction of a branch instruction is predicted, for improving a flow of pipelines. The load/store unit 1180 may execute load and store instructions, may generate virtual addresses used in load and store operations, and may load data from the L2 cache 1190, the cache memory 1300, or the main memory 2000 or may store data in the L2 cache 1190, the cache memory 1300, or the main memory 2000.

The MMU is a component of a core such as the core 1100. The MMU 1200 may be any one of the first MMU 1200_1 to fourth MMU 1200_4 of FIG. 1. The MMU 1200 may include a TLB 1210 (translation lookaside buffer), a page table walker 1220, a page table walk cache 1230, a TTBR 1241 (translation table base register), and a VTTBR 1242 (virtual translation table base register). The page table walker 1220 is described below and may be implemented as a unit analogous to other units of the core 1100. The page table walker 1220 may be implemented as or including a unit that performs logical operations including operations to fetch or initiate fetching by the core 1100, and operations to compare or initiate comparisons by the core 1100. Recently accessed page translations may be cached in the TLB 1210. For each memory access performed by the core 1100, the MMU 1200 may check whether a translation for a given virtual address is cached in the TLB 1210. Multiple entries that are each divided into a tag and data may be stored in the TLB 1210. For example, information of a virtual address may be located in the tag, and information of a physical address may be located in the data. In the case where a translation (mapping information) for the virtual address is cached in the TLB 1210 (in the case of a TLB hit), the translation may be immediately available. In the case where no valid translation for the virtual address exists in the TLB 1210 (in the case of a TLB miss), the translation for the virtual address should be updated in the TLB 1210 through a page table walk that involves searching page tables stored in the cache memory 1300 and/or the main memory 2000. A page table may be a data structure that stores mapping between virtual addresses and physical addresses.

The page table walker 1220 may perform a page table walk for a virtual address which is not found or looked up from the TLB 1210. The page table walker 1220 may "walk" or look up page tables for translating a virtual address into a physical address. The page table walker 1220 may fetch address translation information about a virtual address from page tables stored in the cache memory 1300 or the main memory 2000.

The page table walk cache 1230 may cache or store partial or full address translation information of a virtual address. For example, page tables may be constructed hierarchically. The page table walker 1220 may access or look up the page tables in order (sequentially), may fetch partial address translation information from the page tables, and may store the fetched information in the page table walk cache 1230. Also, the page table walker 1220 may skip accessing or looking up some page tables stored in the cache memory 1300 or the main memory 2000 and may accelerate the page table walk, by looking up partial address translation information previously (already) cached in the page table walk cache 1230.

The TTBR 1241 may store a base address indicating a page table. The VTTBR 1242 may also store a base address indicating a page table. Values of base addresses stored in the TTBR 1241 and the VTTBR 1242 may vary with software (e.g., an application program, an operating system, etc.) executable by the core 1100.

Figure 3:
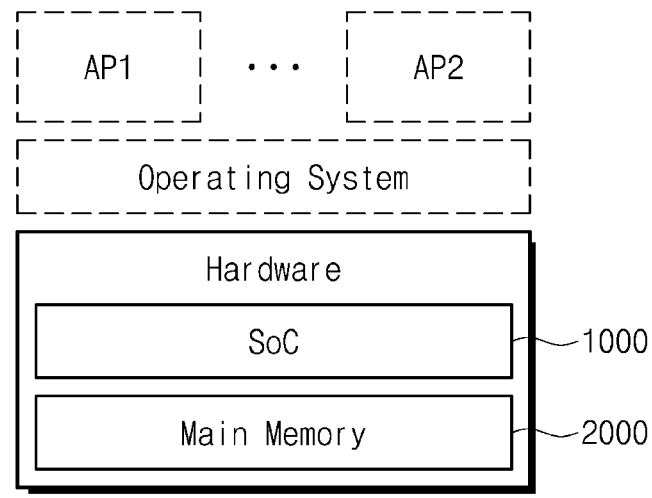
FIG. 3 illustrates a main memory and application programs and an operating system executable by a SoC of FIG. 1.
Figure 4:
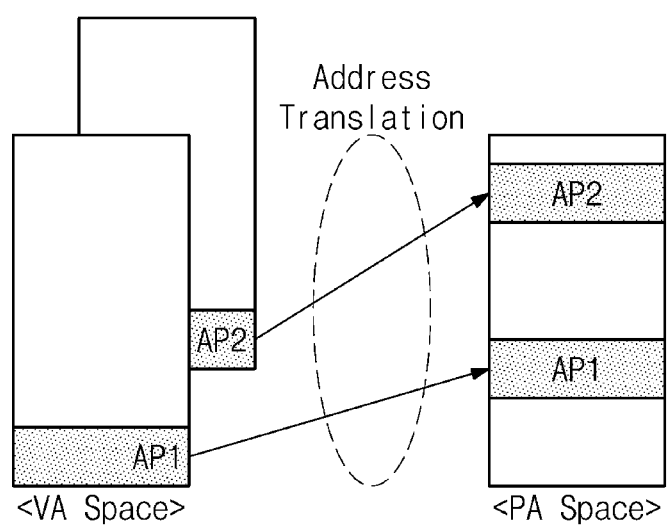
FIG. 4 illustrates mapping between virtual address spaces and physical address spaces of application programs of FIG. 3.

FIG. 3 illustrates a main memory and application programs and an operating system executable by a SoC of FIG. 1. FIG. 4 illustrates mapping between virtual address spaces and physical address spaces of application programs of FIG. 3. FIGS. 3 and 4 will be described together.

Referring to FIG. 3, an operating system may manage hardware including the SoC 1000 and the main memory 2000 and software including application program AP1 and/or application program AP2. The operating system may operate to allow the application program AP1 and/or application program AP2 to be executed on the SoC 1000 and the main memory 2000. The number of the application program AP1 and the application program AP2 illustrated in FIG. 3 is only an example. Referring to FIG. 4, the operating system may map a virtual address space of a process into a physical address space as the first application program AP1 is executed. The operating system may map a virtual address space of a process into a physical address space as the second application program AP2 is executed. The operating system may efficiently use a limited capacity of a memory mounted on hardware by managing the above mappings.

Figure 5:
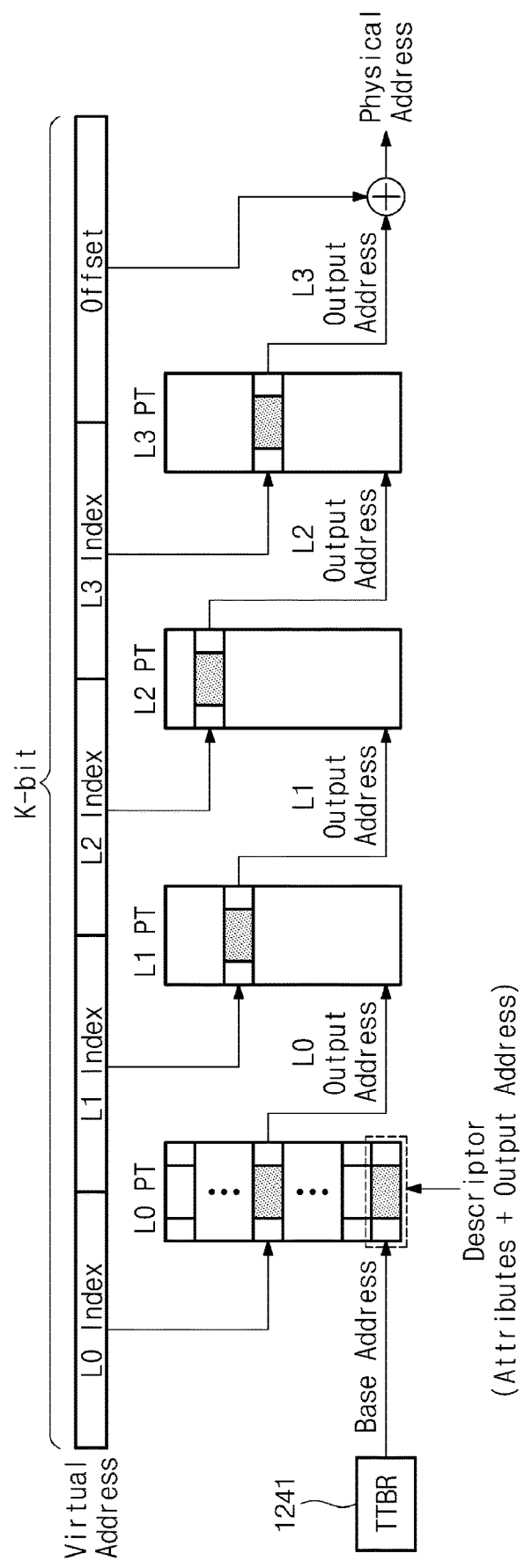
FIG. 5 illustrates an operation in which a page table walker of FIG. 2 performs a page table walk.

FIG. 5 illustrates an operation in which a page table walker of FIG. 2 performs a page table walk. The page table walker 1220 may receive a virtual address from the load/store unit 1180. The virtual address that the page table walker 1220 receives may be an address (i.e., a TLB miss address) that is looked up in the TLB 1210. A multi-bit (e.g., K bits, wherein "K" is a natural number) portion of the virtual address may be divided into an L0 index, an L1 index, an L2 index, an L3 index, and an offset area. The indexes of the virtual address may be divided according to levels L0 to L3. Also, page tables may be divided or hierarchically constructed according to the levels L0 to L3. Accordingly, the indexes may reflect segments of the multi-bit portion each with a different weight, and the page tables may be arranged in a hierarchy constructed corresponding to the weighting of the segments of the multi-bit portion of the virtual address. In FIG. 5, the number of levels, the number of indexes, and the number of page tables are only an example. The page table walker 1220 may sequentially look up the page tables that are hierarchically constructed according to the levels L0 to L3. With respect to a search order, "L0" may be a first level, and "L3" may be the last level.

First, the page table walker 1220 may look up an entry indicated by the L0 index of the virtual address, from among entries of an L0 page table indicated by a base address stored in the TTBR 1241. The L0 page table may be indexed by the L0 index. A descriptor stored in each entry may include attributes and an output address (marked by dark shading). For example, the attributes may include a permission bit, an access bit, a dirty bit, a secure bit, etc. associated with the output address. The page table walker 1220 may fetch a descriptor included in an entry indicated by the L0 index of the virtual address and may store or update partial information (i.e., partial address translation information about the L0 index of the virtual address) of the descriptor in the page table walk cache 1230.

The page table walker 1220 may look up an entry indicated by the L1 index of the virtual address, from among entries of an L1 page table indicated by an L0 output address of the descriptor fetched from the L0 page table. In other words, the page table walker 1220 may look up an entry indicated by the L1 index of the virtual address, from among entries of an L1 page table that are indicated based on an L0 output address of the descriptor fetched from the L0 page table. The page table walker 1220 may fetch a descriptor included in an entry indicated by the L1 index of the virtual address and may store or update partial information (i.e., partial address translation information about the L1 index of the virtual address) of the descriptor in the page table walk cache 1230.

The page table walker 1220 may look up an entry indicated by the L2 index of the virtual address, from among entries of an L2 page table indicated by an L1 output address of the descriptor fetched from the L1 page table. In other words, the page table walker 1220 may look up an entry indicated by the L2 index of the virtual address, from among entries of an L2 page table that are indicated based on an L1 output address of the descriptor fetched from the L1 page table. The page table walker 1220 may fetch a descriptor included in an entry indicated by the L2 index of the virtual address and may store or update partial information (i.e., partial address translation information about the L2 index of the virtual address) of the descriptor in the page table walk cache 1230.

The page table walker 1220 may look up an entry indicated by the L3 index of the virtual address, from among entries of an L3 page table indicated by an L2 output address of the descriptor fetched from the L2 page table. In other words, the page table walker 1220 may look up an entry which the L3 index of the virtual address indicates, from among entries of an L3 page table that are indicated based on an L2 output address of the descriptor fetched from the L2 page table. The page table walker 1220 may fetch a descriptor included in an entry indicated by the L3 index of the virtual address and may store or update partial information (i.e., partial address translation information about the L3 index of the virtual address) of the descriptor in the page table walk cache 1230. Also, because a level corresponding to the L3 index and the L3 page table is the last level, the page table walker 1220 may also store the descriptor in the TLB 1210.

The MMU 1200 may look up a page indicated by an offset of the virtual address, from among pages indicated by an L3 output address of the descriptor fetched from the L3 page table and may calculate a final physical address (e.g., a final physical address=L3 output address+offset). In the case where mapping between the virtual address and the L3 output address (i.e., a final translation) of the L3 page table is cached in the TLB 1210, the MMU 1200 may immediately calculate the final physical address by using the offset and the output address cached in the TLB 1210 and may return the final physical address to the load/store unit 1180.

In an embodiment, the page table walker 1220 may perform a page table walk for one virtual address and may then perform a page table walk for another virtual address. As a page table walk for one virtual address is executed, partial address translation information may be already stored in the page table walk cache 1230. In the case where partial address translation information about a part of indexes of another virtual address is stored in the page table walk cache 1230, the page table walker 1220 may skip an operation(s) of fetching a descriptor from a specific level(s). For example, in the case where partial address translation information of the L0 index is already stored in the page table walk cache 1230 (i.e., when a hit occurs in a page table walk cache), the page table walker 1220 may skip an operation of looking up the L0 page table. As in the above operation of the L0 level, the page table walker 1220 may execute operations of the remaining L1, L2, and L3 levels.

Figure 6:
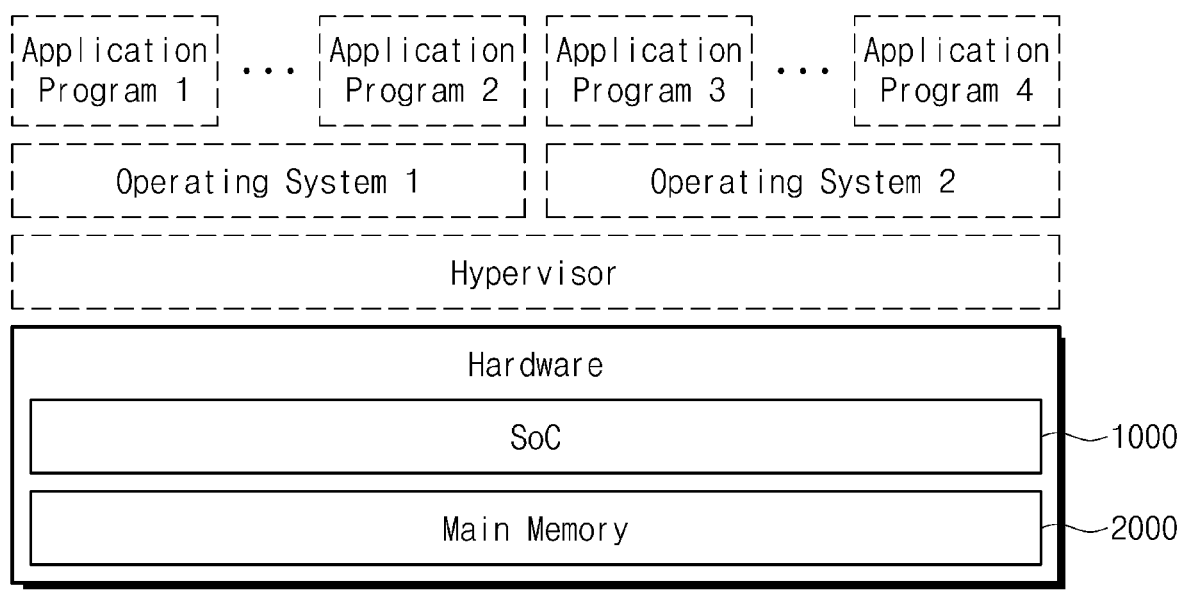
FIG. 6 illustrates a main memory and application programs and operating systems executable by a SoC of FIG. 1.
Figure 7:
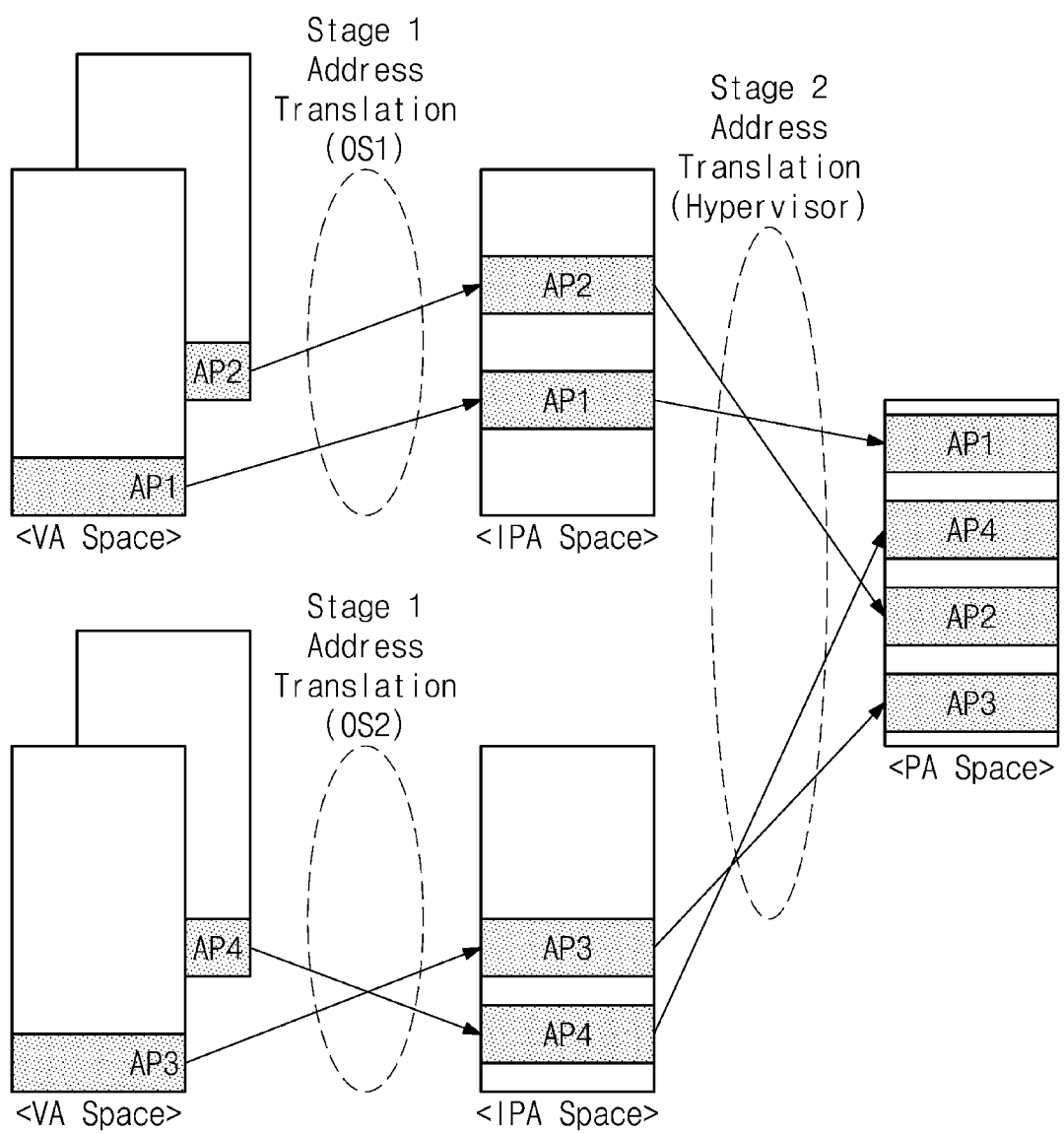
FIG. 7 illustrates mapping between virtual address spaces and physical address spaces of application programs of FIG. 6.

FIG. 6 illustrates a main memory and application programs and operating systems executable by a SoC of FIG. 1. FIG. 7 illustrates mapping between virtual address spaces and physical address spaces of application programs of FIG. 6. FIGS. 6 and 7 will be described together, and a description will be focused on a difference between embodiments based on FIGS. 6 and 7 and embodiments based on FIGS. 3 and 4.

Referring to FIG. 6, a first operating system may manage hardware including the SoC 1000 and the main memory 2000 and software including application program AP1 and/or application program AP2. A second operating system may manage the same hardware including the SoC 1000 and the main memory 2000 and software including application program AP3 and/or application program AP4. A software layer, that is a hypervisor, may be additionally present between the first operating system, the second operating system and the hardware. The hypervisor may be used to operate two or more operating systems by using a restricted resource of hardware.

Referring to FIG. 7, the first operating system may map a virtual address space of a process into an intermediate physical address space as the first application program AP1 is executed. The first operating system may also map a virtual address space of a process into an intermediate physical address space as the second application program AP2 is executed. Similarly, the second operating system may map a virtual address space of a process into an intermediate physical address space as the third application program AP3 is executed. The second operating system may also map a virtual address space of a process into an intermediate physical address space as the fourth application program AP4 is executed. Each of the first operating system and the second operating system may manage an address translation of a first stage between a virtual address and an intermediate physical address. The hypervisor may manage an address translation of a second stage between an intermediate physical address and a physical address. Compared to the case of FIG. 4, the hypervisor being used in a computer system provides an ability for an address translation of a second stage and other of the features described above.

Figure 8A:
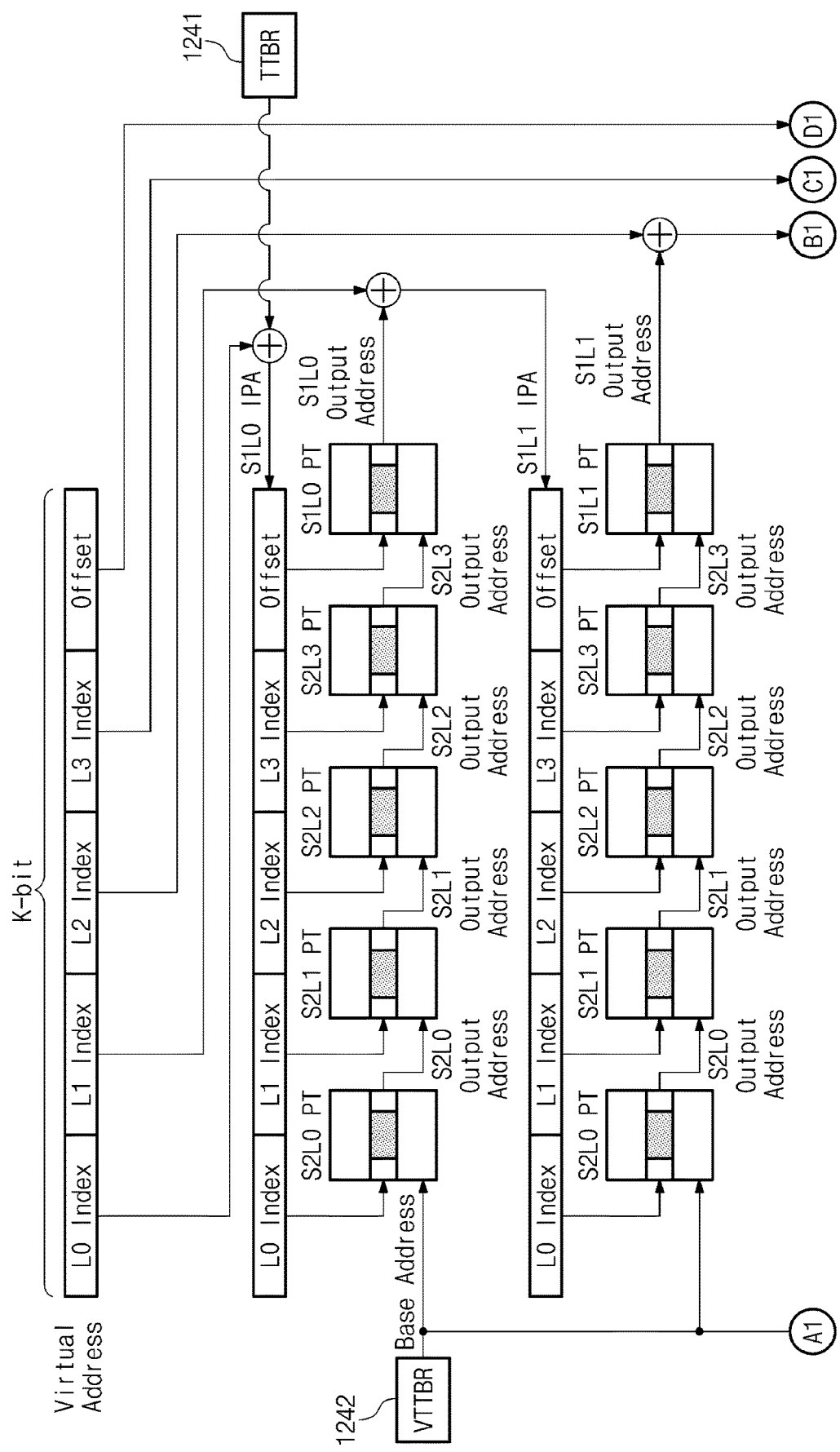
FIG. 8A and FIG. 8B illustrate a flowchart of an operation in which a page table walker of FIG. 2 performs a page table walk based on a first stage and a second stage.
Figure 8B:
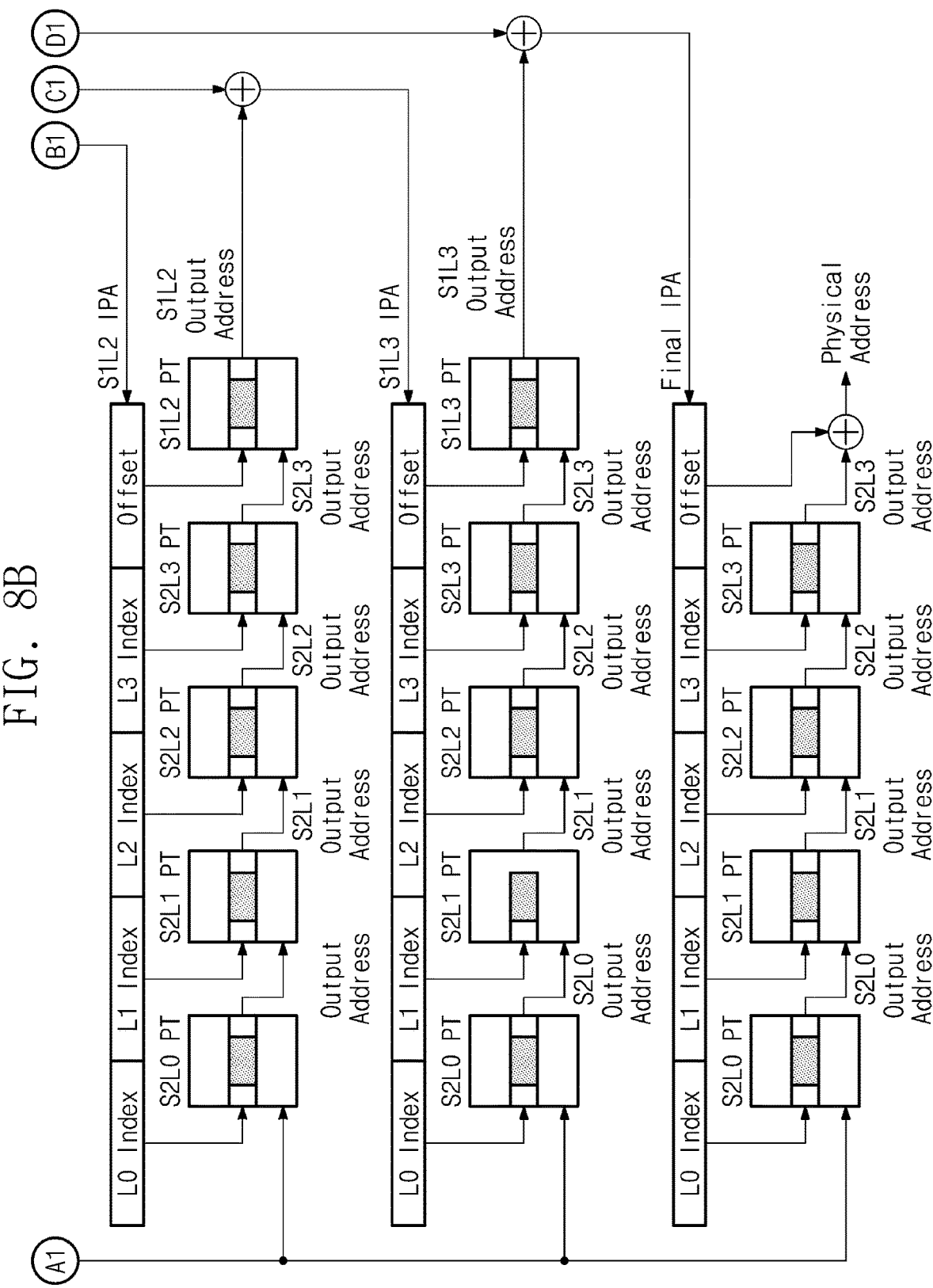

FIG. 8A and FIG. 8B illustrate a flowchart of an operation in which a page table walker of FIG. 2 performs a page table walk based on a first stage and a second stage. FIGS. 8A and 8B will be described together. In FIGS. 8A and 8B, "S", "L", and "PT" represent a stage, a level, and a page table, respectively. The page table walker 1220 may receive a virtual address, which is looked up from the TLB 1210, from the load/store unit 1180. Indexes of the virtual address may be divided according to levels L0 to L3. Page tables may be divided into a first stage S1 and a second stage S2 and may be divided into or hierarchically constructed according to the levels L0 to L3 in each stage. As described with reference to FIGS. 6 and 7, the hypervisor may be used for virtualization. The page table walker 1220 may calculate an S1L0 intermediate physical address (IPA) (also referred to as an "intermediate address") by adding a base address stored in the TTBR 1241 and an L0 index of the virtual address.

The page table walker 1220 may look up an entry indicated by the L0 index of the S1L0 intermediate physical address, from among entries of an S2L0 page table indicated by a base address stored in the VTTBR 1242, may fetch a descriptor included in the entry, and may store partial information (i.e., partial address translation information about the L0 index of the S1L0 intermediate physical address) of the descriptor in the page table walk cache 1230. The page table walker 1220 may look up an entry indicated by the L1 index of the S1L0 intermediate physical address, from among entries of an S2L1 page table indicated by an S2L0 output address, may fetch a descriptor included in the entry, and may store partial information (i.e., partial address translation information about the L1 index of the S1L0 intermediate physical address) of the descriptor in the page table walk cache 1230. As in the operations associated with the S2L1 page table, the page table walker 1220 may perform operations associated with S2L2 and S2L3 page tables respectively indicated by S2L1 and S2L2 output addresses. The page table walker 1220 may look up an entry indicated by an offset of the S1L0 intermediate physical address, from among entries of an S1L0 page table indicated by an S2L3 output address of a descriptor fetched from the S2L3 page table, may fetch a descriptor included in the entry, and may store partial information (i.e., partial address translation information about the offset of the S1L0 intermediate physical address) of the descriptor in the page table walk cache 1230.

The page table walker 1220 may calculate an S1L1 intermediate physical address by adding an S1L0 output address fetched from the S1L0 page table and the L1 index of the virtual address. As in the page table walk of the second stage performed on the S1L0 intermediate physical address, the page table walker 1220 may perform the page table walk of the second stage on the S1L1 intermediate physical address. As in the page table walk of the second stage performed on the S1L1 intermediate physical address, the page table walker 1220 may respectively perform the page table walks of the second stage on an S1L2 intermediate physical address, an S1L3 intermediate physical address, and a final intermediate physical address. The page table walk of the second stage indicates operations of looking up the S2L0 to S2L3 page tables and fetching descriptors, and the page table walk of the first stage indicates operations of looking up the S1L0 to S1L3 page tables and fetching descriptors.

The page table walker 1220 may calculate the S1L0 intermediate physical address by adding the base address stored in the TTBR 1241 and the L0 index of the virtual address and may perform the page table walk of the second stage on the S1L0 intermediate physical address. The page table walker 1220 may also calculate the S1L1 intermediate physical address by adding the S1L0 output address and the L1 index of the virtual address and may perform the page table walk of the second stage on the S1L1 intermediate physical address. The page table walker 1220 may additionally calculate the S1L2 intermediate physical address by adding the S1L1 output address and the L2 index of the virtual address and may perform the page table walk of the second stage on the S1L2 intermediate physical address. The page table walker 1220 may further calculate the S1L3 intermediate physical address by adding the S1L2 output address and the L3 index of the virtual address and may perform the page table walk of the second stage on the S1L3 intermediate physical address. The page table walker 1220 furthermore may calculate the final intermediate physical address by adding the S1L3 output address and the offset of the virtual address and may perform the page table walk of the second stage on the final intermediate physical address. After the page table walk of the second stage is performed on the final intermediate physical address, the page table walker 1220 may store a lastly fetched descriptor in the page table walk cache 1230. Also, the page table walker 1220 may also store the lastly fetched descriptor in the TLB 1210 as a final result. The above operation of the page table walker 1220 may be referred to as a "nested walk".

The MMU 1200 may look up a page indicated by the offset of the virtual address, from among pages indicated by the S2L3 output address of the descriptor fetched from the S2L3 page table and may obtain a physical address from the looked up page (e.g., a final physical address=S2L3 output address+offset). That is, in the case where mapping between the virtual address and the S2L3 output address (i.e., a final translation) is cached in the TLB 1210, the MMU 1200 may immediately calculate the physical address by using the offset and the output address cached in the TLB 1210 and may return the physical address.

An example is illustrated in FIGS. 8A and 8B as the number of levels per stage is 4 and the number of stages is 2, but the teachings of the present disclosure are not limited thereto. For example, the number of levels of a first stage may be "m" ("m" being a natural number of 1 or more), and the number of levels of a second stage may be "n" ("n" being a natural number of 1 or more). In the case where the page table walker 1220 performs a page table walk for a virtual address under a TLB miss and page table walk cache miss condition, the number of times that a descriptor is fetched from a page table may be "(m+1)×(n+1)−1". Of course, the page table walker 1220 may skip an operation of fetching a descriptor with reference to partial address translation information stored in the page table walk cache 1230 while the page table walker 1220 performs page table walks of the first stage and the second stage, respectively.

Figure 9:
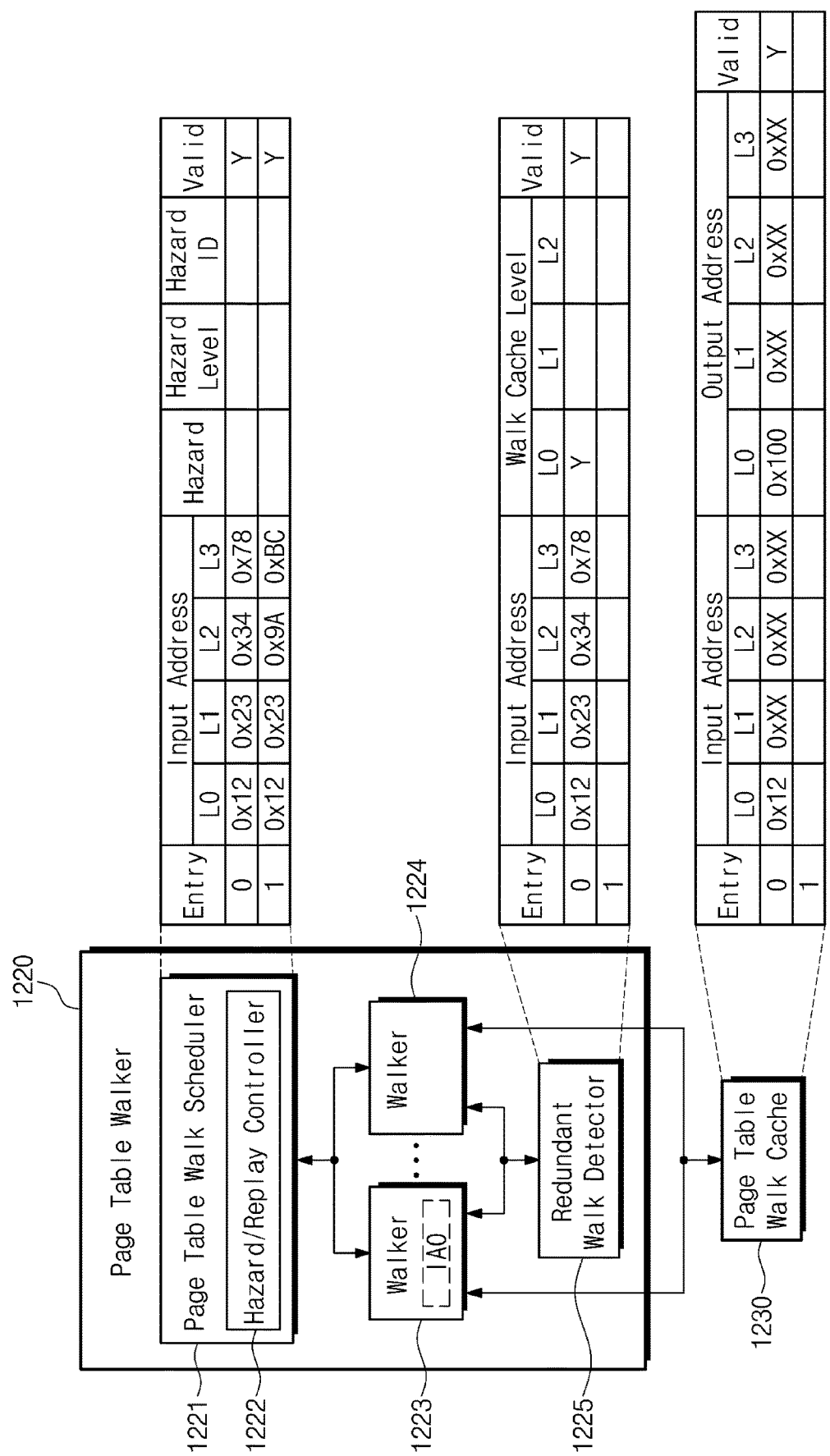
FIG. 9 illustrates a detailed block diagram and operations of a page table walker of FIG. 2.
Figure 10:
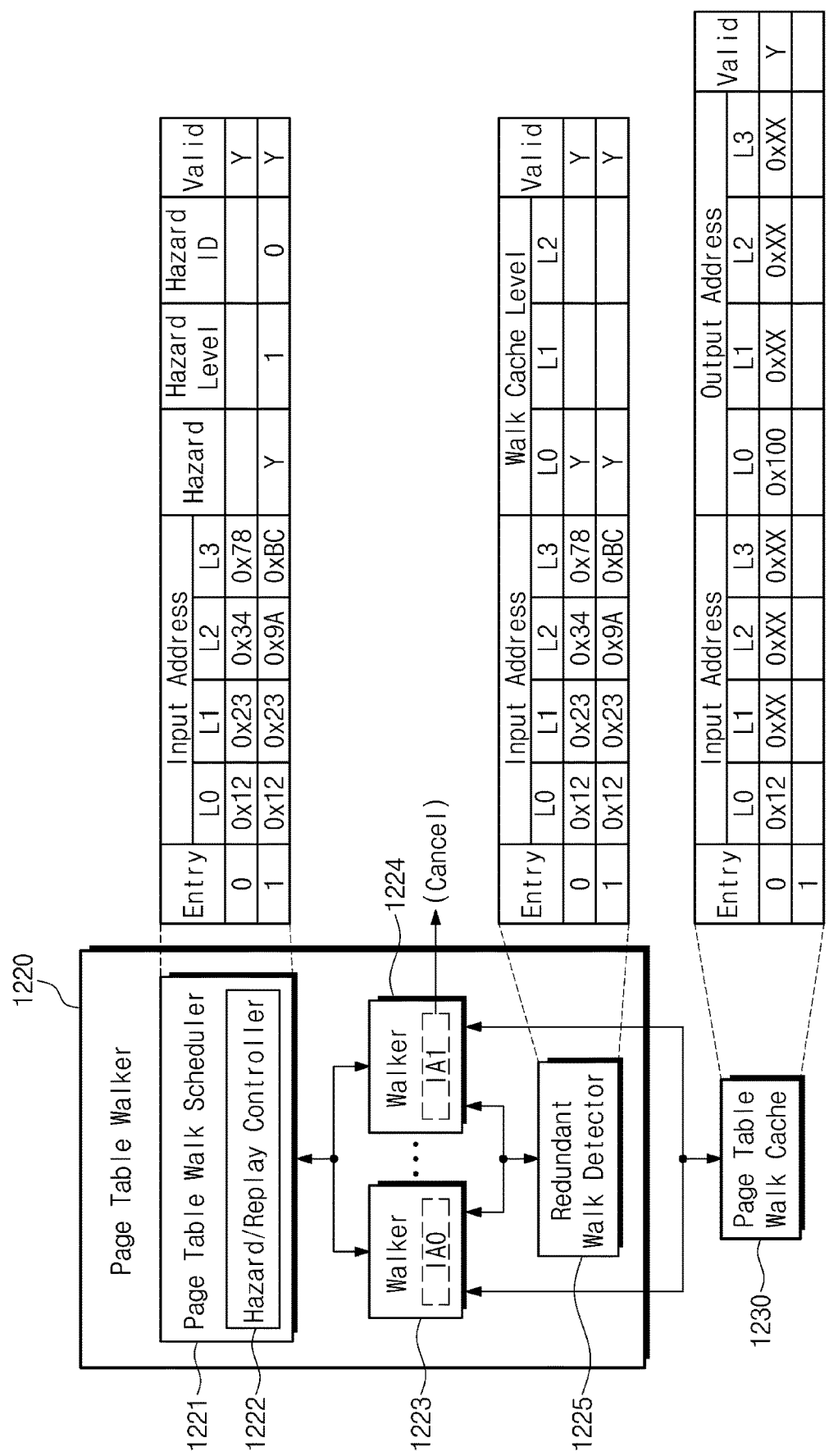
FIG. 10 illustrates another detailed block diagram and operations of a page table walker of FIG. 2.
Figure 11:
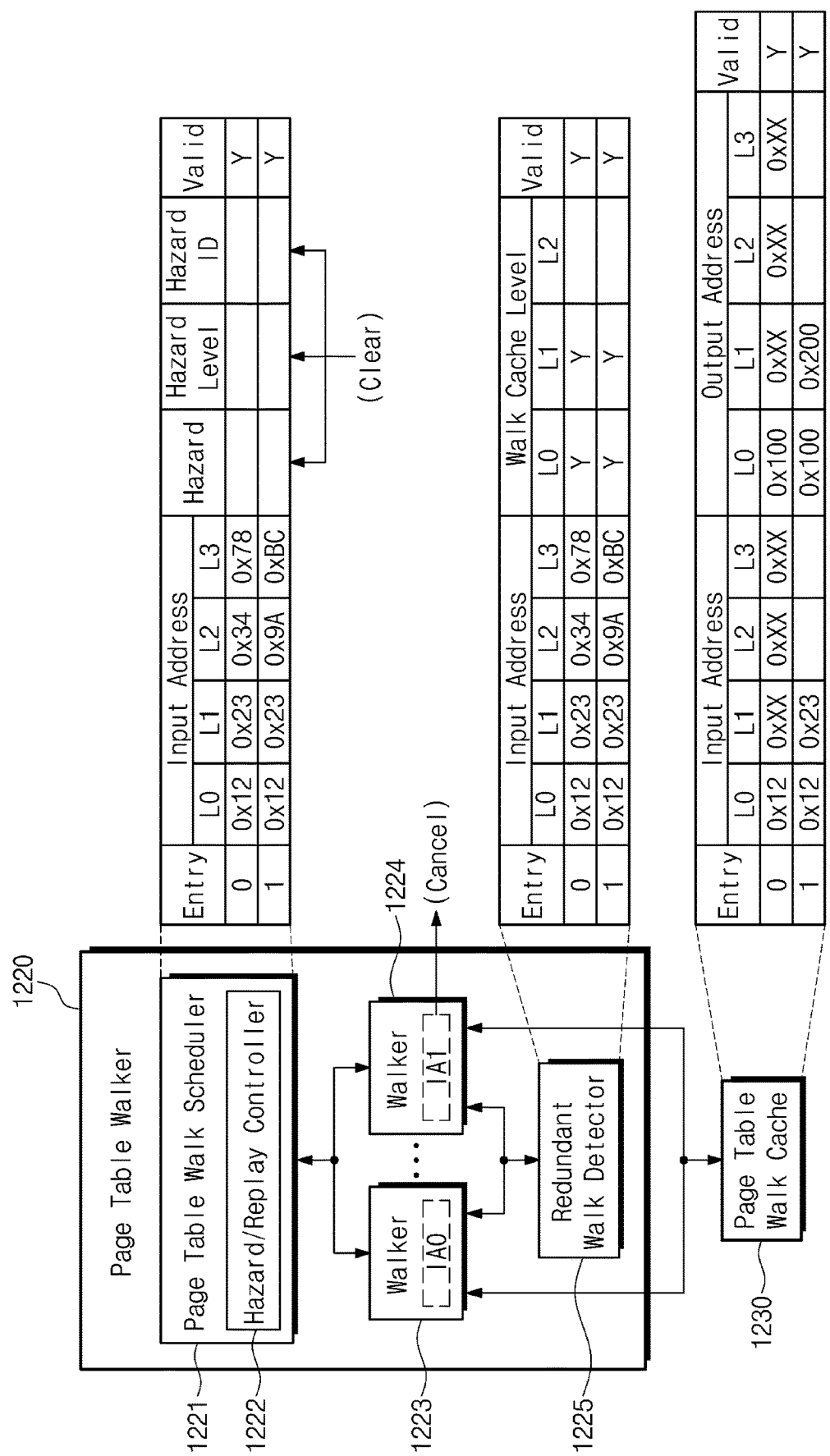
FIG. 11 illustrates another detailed block diagram and operations of a page table walker of FIG. 2.

FIGS. 9 to 11 illustrate detailed block diagrams and operations of a page table walker of FIG. 2. FIGS. 9 to 11 will be described together. In FIGS. 9 to 11, it is assumed that a page table walker performs the page table walk described with reference to FIGS. 3 to 5.

The page table walker 1220 may include a page table walk scheduler 1221, walkers 1223 and 1224, and a redundant walk detector 1225. All components of the page table walker 1220 may be implemented with hardware by using an analog circuit, a digital circuit, a logic circuit, a clock circuit, a flip-flop, a register, etc. In other words, the page table walker 1220 may be accurately labelled a page table walker circuit, whether implemented as a processor/memory combination (e.g., microprocessor/memory) that stores and executes software instructions, or as a logic circuit such as an application-specific integrated circuit. The page table walk scheduler 1221 may receive one or more input addresses (virtual addresses) which have not been looked up from the TLB 1210. The page table walk scheduler 1221 may manage entries, each of which stores or includes L0 to L3 indexes of an input address, a hazard bit, a hazard level bit, and a hazard ID bit. Information associated with a walk request having an input address may be input to each entry of the page table walk scheduler 1221.

A hazard/replay controller 1222 may check or identify a hazard bit, a hazard level bit, and a hazard ID bit of each entry and may provide the input address stored in each entry or the information associated with the walk request having the input address to any one of the walkers 1223 and 1224. Each of the walkers 1223 and 1224 may perform the page table walk for the input address provided from the page table walker 1220 and may fetch output addresses. The input address may be a virtual address, and each of the output addresses fetched by each of the walkers 1223 and 1224 may be a physical address. Unlike the illustration in FIG. 9, the number of the walkers 1223 and 1224 may be more than 2, and the page table walker 1220 may execute 2 or more page table walks in parallel or at the same time.

The redundant walk detector 1225 may calculate a matching level between an input address(es) of a page table walk(s) already determined to be performed by the walkers 1223 and 1224 and an input address of a page table walk that is not yet determined with regard to whether the page table walk is continuously performed. The matching level may indicate how much indexes of one input address and indexes of another input address are matched. Since a similarity between the input addresses may become higher as the matching level becomes higher, execution results of respective page table walks of the input addresses may be similar to each other and may be duplicated (or redundant). The matching level may be also referred to as a "redundancy hit level". The matching level may be calculated by the redundant walk detector 1225, or may be calculated by the page table walk scheduler 1221.

The redundant walk detector 1225 may manage entries that store or include the input addresses input to the walkers 1223 and 1224. For example, input addresses input to the entries of the page table walk scheduler 1221 may be provided to entries of the redundant walk detector 1225 without modification. The redundant walk detector 1225 may obtain and store a walk cache hit level by looking up the page table walk cache 1230 using indexes of the input address stored in each of the entries. The walk cache hit level can be used in a comparison (i.e., with a matching level between indexes of input addresses) by the redundant walk detector 1225 to detect and predict in advance redundancy of a page table walk for an input address. When redundancy can be resultingly avoided, this increases efficiency, avoids unnecessary power consumption and avoids unnecessary processing, as examples of practical implications of the use of the walk cache hit level. Also, the redundant walk detector 1225 may obtain and store a walk cache level that is updated as each of output addresses respectively indicated by the indexes of the input address is stored in the page table walk cache 1230 by the walkers 1223 and 1224 described above.

In the case where a descriptor indicated by any index is already scheduled to be fetched from a memory that stores a page table or is already stored in the page table walk cache 1230, this descriptor does not need to be again fetched from the memory. The redundant walk detector 1225 may compare the matching level with the walk cache hit level and may mark a hazard bit based on a comparison result. The redundant walk detector 1225 may in advance detect and predict redundancy of a page table walk for an input address based on the comparison result. The redundancy of the page table walk for the input address means that redundancy is present in at least a portion of an operation of looking up page tables by using indexes which are matched with indexes of an input address of another page table walk already determined to be performed, from among indexes of an input address. The page table walker 1220 may execute a page table walk in which redundancy is not present, instead of a page table walk in which redundancy is present, thus improving the performance of the SoC 1000 and reducing power consumption of the SoC 1000. The redundant walk detector 1225 may compare the matching level with the walk cache level and may clear the hazard bit marked based on the comparison result. Below, a way to detect redundancy of a page table walk will be more fully described.

Referring to FIG. 9, it is assumed that input addresses are respectively input to entry 0 and entry 1 of the page table walk scheduler 1221, that hazard bits, hazard level bits, and hazard ID bits are in a cleared state, and that a result of a page table walk previously executed, that is address translation information, is stored in entry 0 of the page table walk cache 1230. The number of entries is not limited to the example of FIGS. 9 to 11. In FIGS. 9 to 11, valid bits of valid entries of multiple entries may be marked by "Y".

The page table walk scheduler 1221 may allocate an input address IA0 input to entry 0 to the walker 1223 (which is in a wait state), and the walker 1223 may perform the page table walk for the input address IA0. The walker 1223 may check (or determine) whether output addresses indicated by L0, L1, L2, and L3 indexes 0x12, 0x23, 0x34, and 0x78 are looked up from the page table walk cache 1230. Referring to FIG. 9, the output address 0x100 indicated by the L0 index 0x12 is already stored in the page table walk cache 1230 (an L0 level hit occurs in the page table walk cache 1230). The redundant walk detector 1225 may obtain or calculate that a walk cache hit level of the input address IA0 is "L0" by looking up the page table walk cache 1230 using the L0, L1, L2, and L3 indexes 0x12, 0x23, 0x34, and 0x78 of the input address IA0. Also, when the output address 0x100 indicated by the L0 index 0x12 is stored in the page table walk cache 1230, the redundant walk detector 1225 may mark that the walk cache level of the input address IA) is "L0" (Y). Because the output address 0x100 indicated by the L0 index 0x12 is already stored in the page table walk cache 1230, an operation of fetching the output address 0x100 from a memory may be skipped. However, because an output address indicated by the L1 index 0x23 is not stored in the page table walk cache 1230 (that is, a miss occurs in the page table walk cache 1230), the walker 1223 may initiate (start or begin) fetching the output address indicated by the L1 index 0x23 from the memory.

Referring to FIG. 10, the page table walk scheduler 1221 may allocate an input address IA1 input to entry 1 to the walker 1224. The walker 1224 may perform the page table walk for the input address IA1. The walker 1224 may check whether output addresses indicated by L0, L1, L2, and L3 indexes 0x12, 0x23, 0x9A, and 0xBC are looked up from the page table walk cache 1230. Referring to FIG. 10, the output address 0x100 indicated by the L0 index 0x12 is already stored in the page table walk cache 1230. The redundant walk detector 1225 may obtain or calculate that a walk cache hit level of the input address IA1 is "L0" by looking up the page table walk cache 1230 using the L0, L1, L2, and L3 indexes 0x12, 0x23, 0x9A, and 0xBC. Also, when the output address 0x100 indicated by the L0 index 0x12 is stored in the page table walk cache 1230, the redundant walk detector 1225 may mark that the walk cache level of the input address IA1 is "L0" (Y).

Because the output address 0x100 indicated by the L0 index 0x12 is already stored in the page table walk cache 1230, an operation of fetching the output address 0x100 from a memory may be skipped. Because an output address indicated by the L1 index 0x23 is not stored in the page table walk cache 1230, the walker 1224 may initiate fetching the output address indicated by the L1 index 0x23 from the memory.

In the case where all the walkers 1223 and 1224 fetch the output address indicated by the L1 index 0x23 from the memory, the walkers 1223 and 1224 may fetch the same output address, and thus operations of the walkers 1223 and 1224 may have redundancy and may be duplicated. Because the walker 1223 first starts to fetch the output address indicated by the L1 index 0x23 from the memory, an operation in which the walker 1224 fetches the output address indicated by the L1 index 0x23 from the memory may be redundant and may be duplicative. The redundancy of the page table walk for the input address IA1 is an operation of fetching the output address indicated by the L1 index 0x23 from an L1 page table stored in the memory. Therefore, redundancy of a page table walk to be executed by the walker 1224 can be predicted and/or detected so as to prevent the redundancy.

To detect the redundancy of the page table walk to be executed by the walker 1224, the redundant walk detector 1225 may compare the input addresses IA0 with IA1 in the unit of an index or a level which is based on segments that are each different portions of an input virtual address. The increasing levels of the indexes may reflect granularity of the input virtual address, and the higher the match between a current input virtual address and an existing and/or previous input virtual address, the more redundancy in processing can be avoided as described herein. The L0 index 0x2 and the L1 index 0x23 of the input address IA1 may match (be equal to) the L0 index 0x12 and the L1 index 0x23 of the input address IA0, respectively. The redundant walk detector 1225 may calculate that a matching level between the input addresses IA0 and IA1 is "L1". Also, the redundant walk detector 1225 may calculate that a walk cache hit level of the different input address IA0 compared with the input address IA1 for calculating the matching level is "L0". The redundant walk detector 1225 may compare a matching level L1 between the input address IA0 and the input address IA1 with a walk cache hit level L0 of the input address IA1.

Because the matching level L1 is greater (or higher) than the walk cache hit level L0, the redundant walk detector 1225 may mark a hazard bit of entry 1 of the page table walk scheduler 1221 (Y). The marked hazard bit indicates that the matching level L1 of the input address IA1 is greater than the walk cache hit level L0 and indicates that redundancy is present in the page table walk for the input address IA1. In the case where the hazard bit is marked, the page table walk that is being executed in the walker 1224 for input address IA1 may be canceled. Instead, the walker 1224 may perform a page table walk for an input address stored in another entry (e.g., 2, 3, or 4) of the page table walk scheduler 1221. A redundant use of the walker 1224 may be prevented by the redundant walk detector 1225. As a result of the use of the walk cache hit level in this way, redundancy can be avoided, which in turn may increase efficiency, avoid unnecessary power consumption and avoid unnecessary processing, as examples of practical implications of the use of the walk cache hit level.

In the above example, a description is given as a page table walk is canceled in the case where a hazard bit is marked while the walker 1224 performs a page table walk for the input address IA1. In another embodiment, the page table walk scheduler 1221 may first check whether a hazard bit of the input address IA1 is marked and may then provide the input address IA1 to the walker 1224. In this case, a page table walk may be performed after the redundancy of the page table walk for the input address IA1 is removed (i.e., after the hazard bit is cleared).

The redundant walk detector 1225 may mark a hazard level bit of entry 1 of the page table walk scheduler 1221 as "1". Here, "1" indicates "L1" of levels for constructing page tables hierarchically and is only an exemplary value. The hazard level bit may indicate the highest level of the matched indexes of the input addresses IA0 and IA1 or may indicate another level of the matched indexes of the input addresses IA0 and IA1. The redundant walk detector 1225 may mark a hazard ID of entry 1 of the page table walk scheduler 1221 as "0". The hazard ID may indicate which walker (the walker 1223 in the above example) of the walkers 1223 and 1224 performs the page table walk for the input address IA0 having indexes that are the same as some indexes of the input address IA1.

Referring to FIG. 11, the walker 1223 may complete fetching an output address 0x200 indicated by the L1 index 0x23 of the input address IA0 from the memory, and may store the output address 0x200 in entry 1 of the page table walk cache 1230 to fill entry 1. Partial address translation information for the L1 index 0x23 of the input address IA0 may be stored and updated in the page table walk cache 1230. As the output address 0x200 is stored in entry 1 of the page table walk cache 1230, the redundant walk detector 1225 may update walk cache levels of the input address IA0 and the input address IA1 to "L1". For example, a walk cache hit level may be calculated as a level to which an index of an input address corresponding to an output address fetched most recently belongs. Thus, the walk cache hit level which is used to reduce redundancy may be dynamically updated based on operations of the redundant walk detector 1225.

Because a walk cache level L1 of the input address IA0 is updated, the redundant walk detector 1225 may compare the matching level L1 of the input address IA1 with the walk cache level L1 of the input address IA0. Because the matching level L1 is not greater than (i.e., is the same as) the walk cache hit level L1, the redundant walk detector 1225 may clear the hazard bit, the hazard level bit, and the hazard ID of entry 1 including the input address IA1 of the page table walk scheduler 1221.

When the hazard bit of entry 1 is cleared, the hazard/replay controller 1222 of the page table walk scheduler 1221 may again provide the input address IA1 to the walker 1224. The walker 1224 may look up output addresses 0x100 and 0x200 indicated by the L0 index and the L1 index in the page table walk cache 1230 and may then start fetching an output address indicated by the L2 index from the memory. The walker 1224 may replay or re-execute the page table walk for the input address IA1.

When a hit with regard to the L0 index occurs in the page table walk cache 1230, the lookup of the L0 page table is skipped and the lookups of the remaining L1 to L3 page tables are performed. The walker 1223 fetches output addresses indicated by indexes of the input address IA0 by looking up address translation information (the output address 0x100) stored in the page table walk cache 1230 and at least a part of page tables. While the walker 1223 fetches the output addresses, the redundant walk detector 1225 may compare a matching level between the input address IA0 and the input address IA1 with a walk cache hit level of the input address IA1 and may detect redundancy of the page table walk for the input address IA1. The page table walk scheduler 1221 may not provide the input address IA1 to the walkers 1223 and 1224 until the hazard bit of the input address IA1 is cleared by the redundant walk detector 1225.

Figure 12:
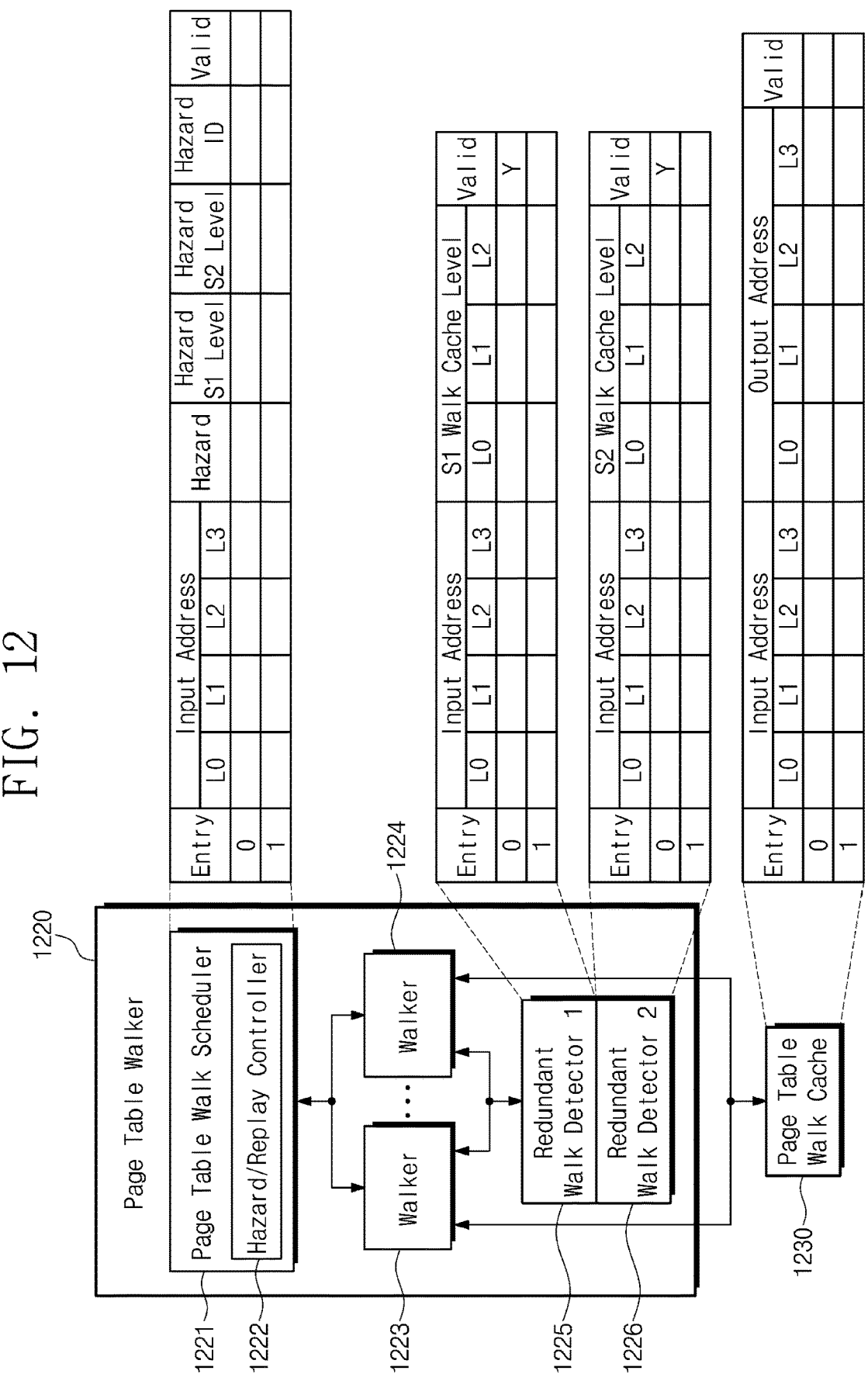
FIG. 12 illustrates another detailed block diagram and operations of a page table walker of FIG. 2.

FIG. 12 illustrates a detailed block diagram of a page table walker of FIG. 2 and entries managed by a page table walker. In FIG. 12, it is assumed that a page table walker performs the page table walk of the first stage described with reference to FIGS. 6 to 8B and the page table walk of the second stage. A description will be focused on differences between embodiments based on FIG. 12 and embodiments based on FIGS. 9 to 11.

The page table walker 1220 may include the redundant walk detector 1225 as a first redundant walk detector, and a second redundant walk detector 1226. The redundant walk detector 1225 as the first redundant walk detector may be associated with the page table walk of the first stage for translating a virtual address into an intermediate physical address. The second redundant walk detector 1226 may be associated with the page table walk of the second stage for translating the intermediate physical address into a physical address.

As the redundant walk detector 1225 described with reference to FIGS. 9 to 11, the first redundant walk detector may detect redundancy of the page table walk of the first stage. The redundant walk detector 1225 as the first redundant walk detector may compare a first matching level between an input address (a virtual address), such as a current input address, and another input address, such as a previous input address, with a first walk cache hit level obtained by looking up the page table walk cache 1230 using indexes of the input address. The redundant walk detector 1225 as the first redundant walk detector may mark a hazard bit, a first stage hazard level bit, and a hazard ID bit based on a comparison result.

As with the redundant walk detector 1225 described with reference to FIGS. 9 to 11, the second redundant walk detector 1226 may detect redundancy of the page table walk of the second stage. The second redundant walk detector 1226 may compare a second matching level between an input address, and another input address, with a second walk cache hit level obtained by looking up the page table walk cache 1230 using indexes of the input address. For example, the input address may be an intermediate physical address such as a current intermediate physical address, and the other input address may be another intermediate physical address such as a previous intermediate physical address. The second redundant walk detector 1226 may mark a hazard bit, a second stage hazard level bit, and a hazard ID bit based on a comparison result. A hazard bit that is marked or cleared by the redundant walk detector 1225 as the first redundant walk detector may be the same as or different from a hazard bit that is marked or cleared by the second redundant walk detector 1226.

The walker 1223 fetches intermediate physical addresses that are output addresses fetched from the S1L0 to S1L3 page tables of FIGS. 8A and 8B and that are indicated by the indexes of the input address such as the current input address. The walker fetches the intermediate physical addresses by looking up address translation information of the first stage stored in the page table walk cache 1230 and at least a part of page tables of the first stage. While the walker 1223 fetches the intermediate physical addresses, the redundant walk detector 1225 as the first redundant walk detector may compare the first matching level with the first walk cache hit level and may detect redundancy of a page table walk for the input address. Also, the walker 1223 fetches physical addresses that are output addresses fetched from the S2L0 to S2L3 page tables of FIGS. 8A and 8B and that are indicated by indexes of the intermediate physical addresses. The walker 1223 fetches the physical addresses by looking up address translation information of the second stage stored in the page table walk cache 1230 and at least a part of page tables of the second stage. While the walker 1223 fetches the physical addresses, the second redundant walk detector 1226 may compare the second matching level between the intermediate physical addresses with the second walk cache hit level and may detect redundancy of a page table walk for the intermediate physical address. Each of the walkers 1223 and 1224 may perform the page table walk for the input address provided from the page table walker 1220 and may fetch an output address. For example, the input address may be a virtual address, and each of the output addresses may be an intermediate physical address. For another example, the input address may be an intermediate physical address, and each of the output addresses may be a physical addresses.

Figure 13:
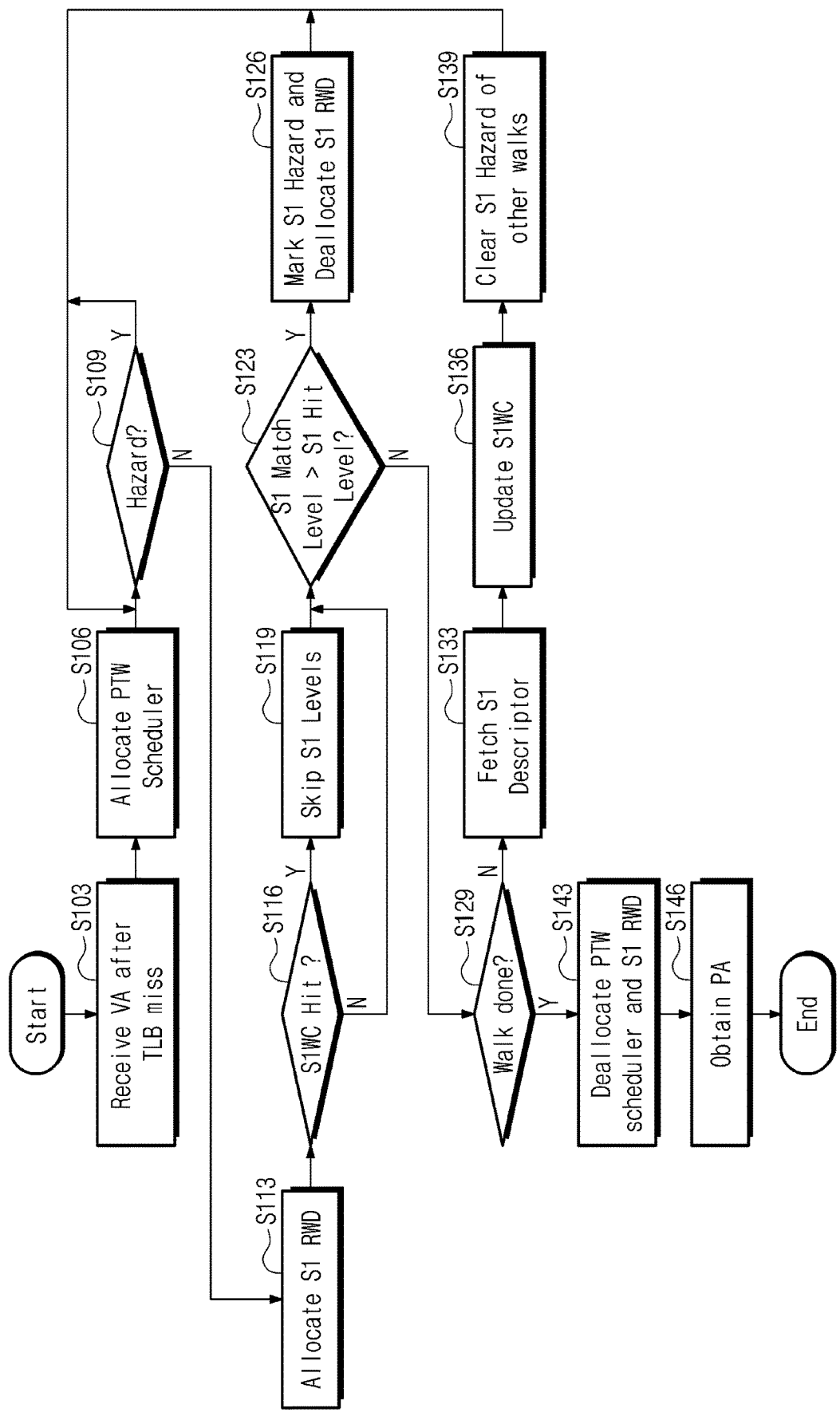
FIG. 13 illustrates a flowchart in which a page table walker of FIG. 2 performs a page table walk for translating a virtual address into a physical address.

FIG. 13 illustrates a flowchart in which a page table walker of FIG. 2 performs a page table walk for translating a virtual address into a physical address, and is described with reference to FIG. 5. In operation S103, the page table walker 1220 may receive a virtual address (i.e., an input address) after a TLB miss. The input address that the page table walker 1220 receives is an address that is not looked up from the TLB 1210. The MMU 1200 may look up the TLB 1210 by using the input address and a context. For convenience of description, the input address is illustrated in FIGS. 5 and 8A and 8B as including indexes and an offset, but the input address may further include a context. For example, the context may be information of an address space ID (ASID), a privilege level, non-secure, virtual machine ID (VMID), etc.

In operation S106, the page table walker 1220 may allocate or provide the input address and the context to the page table walk scheduler 1221. For example, as described with reference to FIG. 9, input addresses may be respectively stored in entries of the page table walker 1220.

In operation S109, the page table walk scheduler 1221 may check whether a hazard bit for the input address is marked. When the hazard bit is marked (S109=Y), the page table walk scheduler 1221 may not allocate the input address to the walkers 1223 and 1224 until the hazard bit is cleared. The page table walk for the input address may not be executed until the hazard bit is cleared.

In operation S113, when the hazard bit is not marked (S109=N) or is cleared, the page table walk scheduler 1221 may allocate the input address to any one (e.g., an idle walker that is not performing a page table walk) of the walkers 1223 and 1224. Also, the page table walk scheduler 1221 may allocate the input address to the redundant walk detector 1225.

In operation S116, a walker may check whether partial and full address translation information is stored in the page table walk cache 1230. For example, the walker may be any one of the walkers 1223 and 1224, the partial and full address translation information may be descriptors indicated by indexes of the input address such as the current input address, and the page table walk cache 1230 may be the page table walk cache S1WC of the first stage. That is, in operation S116 a walker to which the input address is allocated may check whether partial and full address translation information associated with the input address and the context is stored in the page table walk cache 1230. The walker may identify the highest level, among levels of the first stage of output addresses indicated by the indexes of the input address, that is stored in the page table walk cache 1230. The walker may check the level of the first stage of the stored output addresses in the page table walk cache 1230 indicated by indexes of an input address. When the walker looks up the page table walk cache 1230, the walker may further refer to the context as well as an index of each of levels L0 to L3 of the first stage. For example, the walker may use partial address translation information of an entry of the page table walk cache 1230, which has a context and indexes matching requested context and indexes, respectively.

In operation S119, when a hit occurs in the page table walk cache 1230 (S116=Y), the walker may skip operations of fetching an output address(es) stored in the page table walk cache 1230 or indicated by the hit index(es). The walker may skip the operations of fetching the output address(es) until a hit level of the first stage. For example, in the case where a current input address is the input address IA1 of FIG. 11, the walker may skip operations of fetching output addresses respectively indicated by the L0 and L1 indexes. The walker may skip operations of fetching corresponding output addresses from a first level (e.g., L0) to a hit level (e.g., L1) of the first stage hit in operation S116. As a hit level of the first stage becomes higher, the number of page tables that the walker looks up may decrease.

In operation S123, the redundant walk detector 1225 may detect whether redundancy is present in an operation (e.g., a page table walk) in which the walker fetches an output address(es) indicated by an index(es) not hit in the page table walk cache 1230 by comparing a matching level with a walk cache hit level. The redundant walk detector 1225 may calculate a matching level(s) of the first stage between the input address(es) (or any other input address(es)) of the outstanding page table walk(s) and the current input address. The matching level(s) may indicate the level(s) of the matched indexes of the current input address and any other input address(es) (e.g., a matching level corresponding to a hazard level bit). As the matching level becomes higher, the degree to which the indexes of the current input address and indexes of another input address match with each other may become higher. The redundant walk detector 1225 may calculate the highest (maximum) matching level of matching levels as a matching level of the current input address. Also, the redundant walk detector 1225 may look up the page table walk cache 1230 by using the indexes of the current input address and may obtain a walk cache hit level of the first stage.

In operation S126, when the matching level is higher than the walk cache hit level (i.e., when redundancy is detected) (S123=Y), the redundant walk detector 1225 may update hazard information (e.g., a hazard bit, a hazard level bit, and a hazard ID bit) in an entry that stores or includes the input address and the context so that a page table walk including the redundancy is not performed. The redundant walk detector 1225 may mark a hazard bit of the first stage for the input address. Also, the input address that the hazard bit is marked for may be deallocated from the redundant walk detector 1225. As described for operation S109, until the marked hazard bit is cleared, the input address may not be allocated to the walkers 1223 and 1224 and the redundant walk detector 1225. The page table walker 1220 may not provide the current input address to the walkers 1223 and 1224, may not perform the page table walk for the current input address and may cancel or stop the page table walk when the page table walk is being performed.

In operation S129, when the matching level is not higher than the walk cache hit level (S123=N), the walker may check whether the page table walk for the input address is completed. In operation S133, when the page table walk for the input address is not completed (S129=N), the walker may fetch an output address that is indicated by the index of the input address and is not looked up from the page table walk cache 1230. In operation S136, the walker may store the fetched output address in the page table walk cache 1230 (i.e., the page table walk cache 1230 is updated). The output address fetched by the walker may also be stored in the redundant walk detector 1225 (i.e., the redundant walk detector 1225 is updated).

In operation S139, the redundant walk detector 1225 may obtain or calculate a walk cache level that is updated as the output address indicated by the index of the input address is stored in the page table walk cache 1230. The redundant walk detector 1225 may clear a hazard bit(s) of the first stage of any other page table walk(s), based on a result of comparing a walk cache level of the current input address with a matching level(s) of the current input address and the other input address(es). For example, when a walk cache level reaches or is the same as a matching level, the redundant walk detector 1225 may clear a hazard bit of another input address previously input. Operation S133 and operation S136 may be repeatedly performed until it is determined in operation S129 that a page table walk is completed; as operation S133 and operation S136 are repeatedly performed, a walk cache level may gradually become higher.

When the page table walk is completed (S129=Y), in operation S143, the input address may be deallocated from the page table walk scheduler 1221 and the redundant walk detector 1225. In operation S146, the MMU 1200 may obtain a physical address corresponding to the virtual address (i.e., the input address) with reference to address translation information stored in the TLB 1210.

Figure 14A:
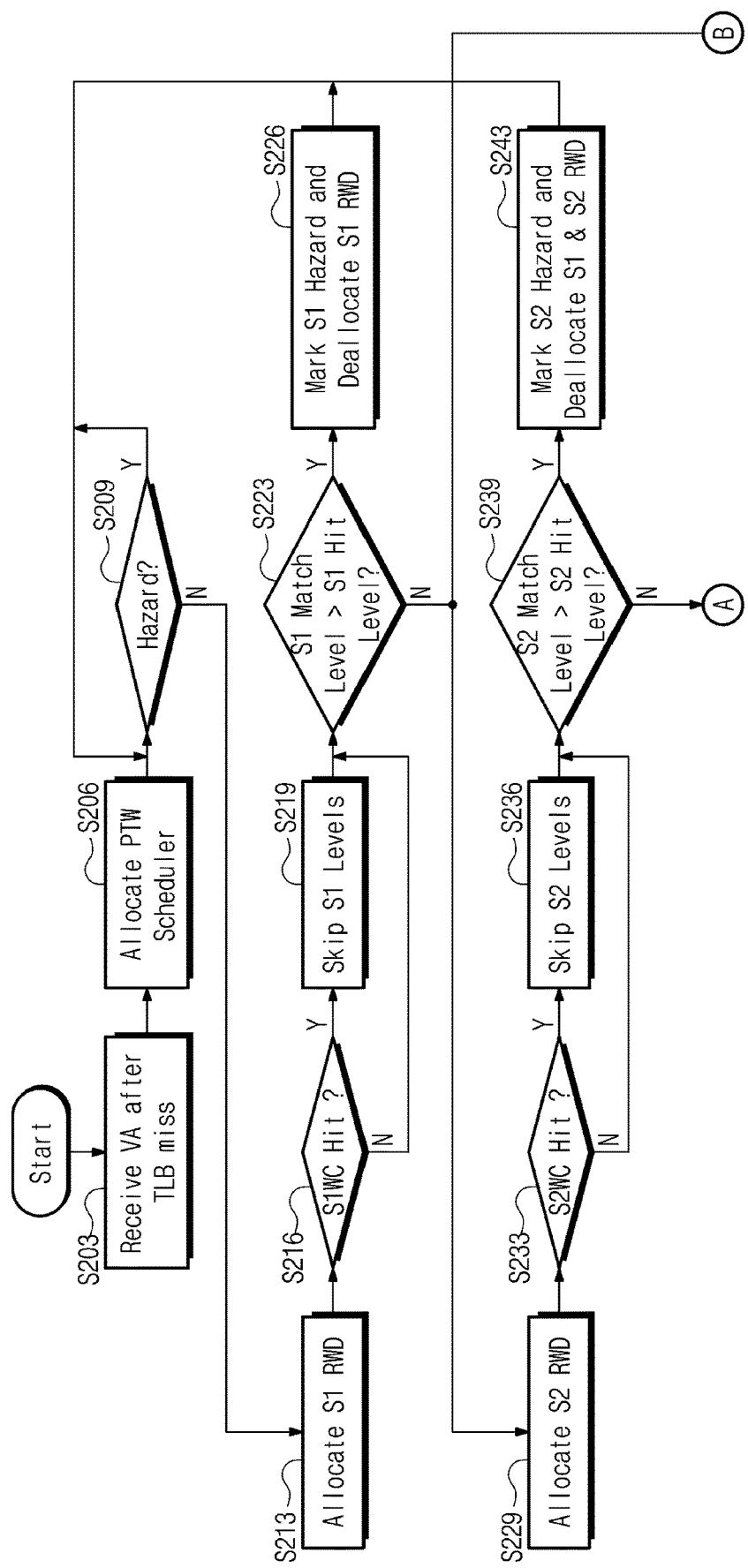
FIG. 14A and FIG. 14B illustrate a flowchart of an operation in which a page table walker of FIG. 2 performs a page table walk of a first stage for translating a virtual address into an intermediate physical address and a page table walk of a second stage for translating an intermediate physical address into a physical address.
Figure 14B:
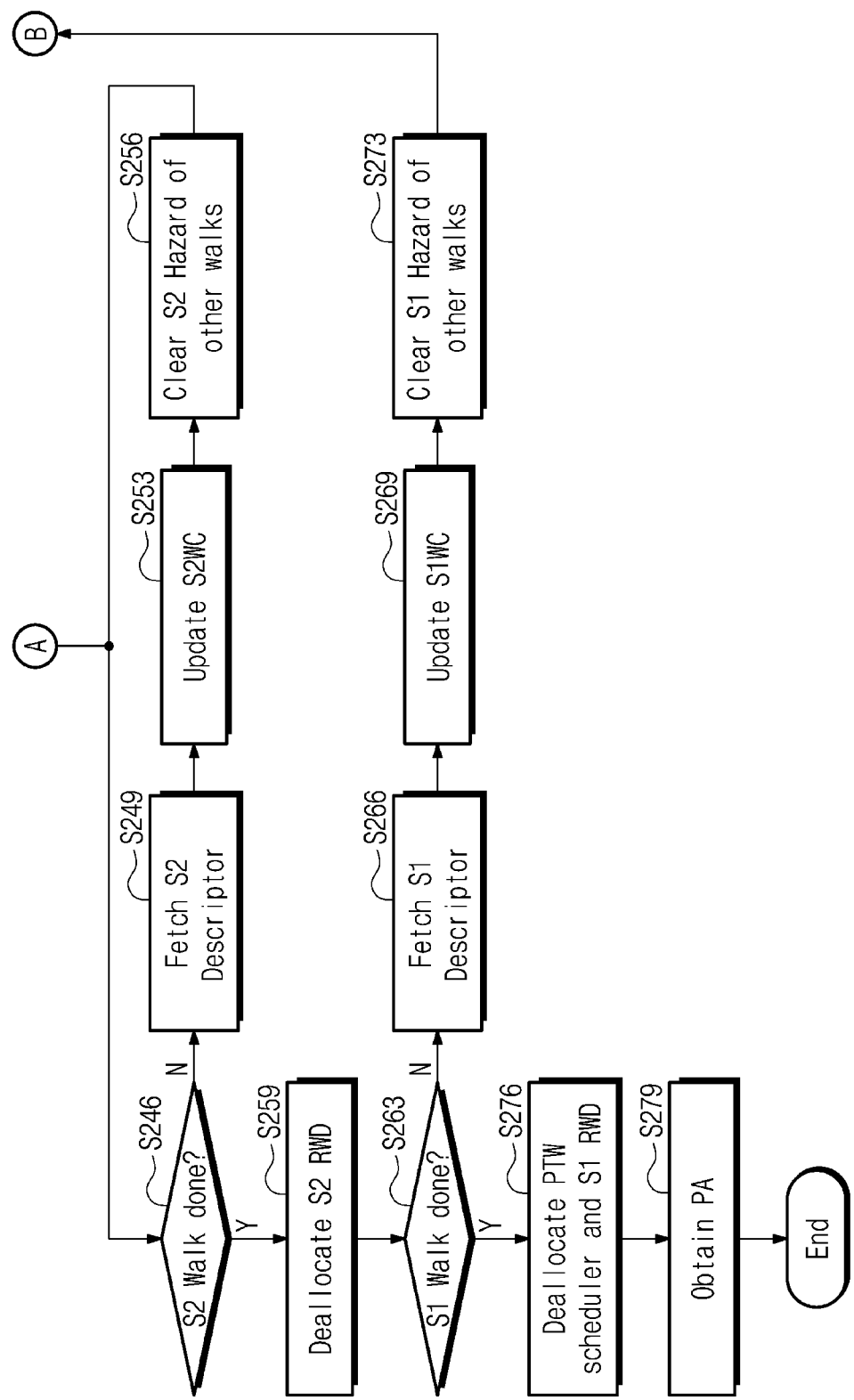

FIGS. 14A and 14B illustrate a flowchart in which a page table walker of FIG. 2 performs a page table walk of a first stage for translating a virtual address into an intermediate physical address and a page table walk of a second stage for translating an intermediate physical address into a physical address, which are described with reference to FIGS. 8A and 8B. FIGS. 14A and 14B will be described together.

As in operation S103, in operation S203, the page table walker 1220 may receive a virtual address (i.e., an input address) after a TLB miss. As in operation S106, in operation S206, the page table walker 1220 may allocate or provide the virtual address and a context to the page table walk scheduler 1221. As in operation S109, in operation S209, the page table walk scheduler 1221 may check whether a hazard bit of a first stage or second stage for the virtual address is marked. As described above, the hazard bit may be managed together by the redundant walk detector 1225 as the first redundant walk detector and by the second redundant walk detector 1226 with regard to the first stage and the second stage. Alternatively, the hazard bit of the first stage may be managed by the redundant walk detector 1224 as the first redundant walk detector, and the hazard bit of the second stage may be managed by the second redundant walk detector 1226.

As in operation S113, in operation S213, when the hazard bit is not marked or is cleared (S209=N), the page table walk scheduler 1221 may allocate the virtual address to any one of the walkers 1223 and 1224 and the redundant walk detector 1225 as the first redundant walk detector. As in operation S116, in operation S216, the walker to which the virtual address is allocated may check whether partial and full address translation information associated with the virtual address and the context is stored in the page table walk cache 1230. For example, the partial and full translation information may be descriptors indicated by indexes of the virtual address, and the page table walk cache 1230 may be the page table walk cache S1WC of the first stage. As in operation S119, in operation S219, the walker may skip operations of fetching an output address(es) until a hit level of the first stage of operation S216. As in operation S123, in operation S223, the redundant walk detector 1225 as the first redundant walk detector may detect whether redundancy is present in an operation (e.g., a page table walk) in which the walker fetches an output address(es) indicated by an index (es) not hit in the page table walk cache 1230, by comparing a walk cache hit level with a matching level of the first stage. As in operation S126, in operation S226, when the matching level of the first stage is higher than a walk cache hit level (S223=Y), the redundant walk detector 1225 as the first redundant walk detector may mark the hazard bit of the first stage for the virtual address. The input address that the hazard bit is marked may be deallocated from the redundant walk detector 1225 as the first redundant walk detector.

In operation S229, when the matching level is not greater than the walk cache hit level (S223=N), the page table walk scheduler 1221 may allocate an intermediate physical address of the virtual address to the second redundant walk detector 1226. In operation S233, the walker (e.g., the same as the walker of operation S216) may determine whether partial and full address translation information (e.g., descriptors that indexes of the intermediate physical address indicate) of the intermediate physical address is stored in the page table walk cache 1230 (e.g., a page table walk cache S2WC of the second stage). Here, both the page table walk cache S1WC of the first stage and the page table walk cache S2WC of the second stage may be included in the page table walk cache 1230, or the page table walk cache S1WC of the first stage and the page table walk cache S2WC of the second stage may be separately implemented in the page table walk cache 1230. In operation S236, the walker may skip operations of fetching an output address(es) until a hit level of the second stage of operation S233.

In operation S239, the second redundant walk detector 1226 may detect whether redundancy is present in an operation (e.g., a page table walk) in which the walker fetches an output address(es) indicated by an index(es) not hit in the page table walk cache 1230, by comparing a walk cache hit level with a matching level of the second stage. The second redundant walk detector 1226 may calculate a matching level(s) of the second stage between an intermediate physical address(es) of the outstanding page table walk(s) and a current intermediate physical address. The matching level(s) may indicate the level(s) of the matched indexes of the current intermediate physical address and any other input address(es). The second redundant walk detector 1226 may calculate the highest (maximum) matching level of matching levels as a matching level of the current intermediate physical address. Also, the second redundant walk detector 1226 may look up the page table walk cache 1230 by using the indexes of the current intermediate physical address and may obtain a walk cache hit level of the second stage. In operation S243, when the matching level of the second stage is higher than a walk cache hit level (S239=Y), the second redundant walk detector 1226 may mark the hazard bit of the second stage for the intermediate physical address. The intermediate physical address that the hazard bit is marked may be deallocated from the second redundant walk detector 1226.

In operation S246, when the matching level is not higher than the walk cache hit level (S239=N), the walker may check whether the page table walk of the second stage for the intermediate physical address is completed. When the page table walk is not completed (S246=N), in operation S249, the walker may fetch an output address that is indicted by the index of the intermediate physical address and is not found from the page table walk cache 1230. In operation S253, the walker may store the fetched output address in the page table walk cache 1230 (i.e., the page table walk cache 1230 is updated). The output address fetched by the walker may also be stored in the second redundant walk detector 1226 (i.e., the second redundant walk detector 1226 is updated).

In operation S256, the second redundant walk detector 1226 may obtain or calculate a walk cache level that is updated as the output address indicated by the index of the intermediate physical address is stored in the page table walk cache 1230. The second redundant walk detector 1226 may clear a hazard bit(s) of the second stage of any other page table walk(s), based on a result of comparing a walk cache level of the current intermediate physical address with a matching level(s) between the current intermediate physical address and the other intermediate physical address(es). Operation S249 and operation S253 may be repeatedly performed until it is determined in operation S246 that a page table walk of the second stage is completed. As operation S249 and operation S253 are repeatedly performed, a walk cache hit level may gradually become higher.

When the page table walk is completed (S246=Y), in operation S259, the intermediate physical address may be deallocated from the second redundant walk detector 1226. Afterwards, operation S263 to operation S273 may be substantially the same as operation S129 to operation S139 of FIG. 13. When the first page table walk is completed (S263=Y), in operation S276, the input address may be deallocated from the page table walk scheduler 1221 and the redundant walk detector 1225 as the first redundant walk detector. In operation S279, the MMU 1200 may obtain a physical address corresponding to the virtual address (i.e., the input address) with reference to address translation information stored in the TLB 1210.

According to an embodiment of the present disclosure, redundancy of a page table walk may be predicted and detected by comparing a matching level with a walk cache hit level. A processor may perform another page table walk from which redundancy is absent, thus improving the performance of the processor and reducing power consumption.

While the teachings of the inventive concept(s) described herein have been made with reference to exemplary embodiments thereof, it will be apparent to those of ordinary skill in the art that various changes and modifications may be made thereto without departing from the spirit and scope of the present disclosure as set forth in the following claims.

What is claimed is:

1. A processor, comprising:
   a page table walk cache configured to store address translation information; and
   a page table walker,
   wherein the page table walker is configured to:
   fetch first output addresses indicated by first indexes of a first input address by looking up the address translation information and at least a part of page tables; and
   compare a matching level between second indexes of a second input address and the first indexes of the first input address with a walk cache hit level obtained by looking up the page table walk cache using the second indexes, and
   wherein, based on a result of comparing the matching level with the walk cache hit level, the page table walker is configured to detect, in advance, that a redundancy is present in an operation of looking up the at least a part of the page tables by using indexes which match the first indexes of the first input address, from among the second indexes of the second input address.

2. The processor of claim 1, wherein each of the first input address and the second input address is a virtual address, and
   each of the first output addresses and second output addresses indicated by the second indexes of the second input address is a physical address.

3. The processor of claim 1, wherein each of the first input address and the second input address is an intermediate address, and
   each of the first output addresses and second output addresses indicated by the second indexes of the second input address is a physical address.

4. The processor of claim 1, wherein each of the first input address and the second input address is a virtual address, and
   each of the first output addresses and second output addresses indicated by the second indexes of the second input address is an intermediate address.

5. The processor of claim 1, wherein, when the matching level is detected to be higher than the walk cache hit level, the page table walker does not execute fetching second output addresses indicated by the second indexes of the second input address until the matching level is the same as or smaller than a walk cache level updated as each of the first output addresses is stored in the page table walk cache.

6. The processor of claim 1, wherein, when the matching level is detected to be higher than the walk cache hit level while second output addresses indicated by the second indexes of the second input address are fetched, the page table walker stops fetching the second output addresses indicated by the second indexes until the matching level is the same as or smaller than a walk cache level updated as each of the first output addresses is stored in the page table walk cache.

7. The processor of claim 1, wherein the matching level is a first matching level, and
wherein the page table walker is further configured to:
fetch third output addresses indicated by third indexes of a third input address by looking up the address translation information and at least a part of the page tables; and
compare a second matching level between the second indexes of the second input address and the third indexes of the third input address with the walk cache hit level, when the second matching level is greater than the first matching level, while fetching the first output addresses and the third output addresses.

8. The processor of claim 1, wherein the page table walker comprises:
a page table walk scheduler configured to manage a first entry to which information about a walk request including the first input address is input and a second entry to which information about a walk request including the second input address is input; and
a plurality of walkers configured to fetch the first output addresses and to fetch second output addresses indicated by the second indexes of the second input address.

9. The processor of claim 8, wherein the second entry of the page table walk scheduler comprises a hazard bit that is marked according to a result of comparing the matching level with the walk cache hit level.

10. The processor of claim 9, wherein, when the hazard bit is marked, the page table walk scheduler does not provide the second indexes of the walk request having the second input address included in the second entry to the plurality of walkers until the hazard bit is cleared.

11. A processor, comprising:
a page table walk cache configured to store address translation information; and
a page table walker,
wherein the page table walker is configured to:
fetch first intermediate addresses indicated by first indexes of a first input address by looking up the address translation information and at least a part of first page tables of a first stage and fetch first output addresses indicated by second indexes of each of the first intermediate addresses by looking up the address translation information and at least a part of second page tables of a second stage; and
compare a matching level between fourth indexes of each of second intermediate addresses indicated by third indexes of a second input address and the second indexes of each of the first intermediate addresses with a walk cache hit level obtained by looking up the page table walk cache using the fourth indexes, and
wherein the page table walker comprises:
a page table walk scheduler configured to manage a first entry to which information about a walk request including the first input address is input and a second entry to which information about a walk request including the second input address is input;
a plurality of walkers configured to fetch the first intermediate addresses associated with the first input address and the first output addresses, and to fetch the second intermediate addresses associated with the second input address and second output addresses indicated by the fourth indexes of each of the second intermediate addresses; and
a redundant walk detector configured to compare the matching level with the walk cache hit level.

12. The processor of claim 11, wherein, a walk cache level is updated as each of the first output addresses is stored in the page table walk cache, and when the walk cache level is detected to reach the matching level, the page table walker executes fetching second output addresses indicated by the fourth indexes of each of the second intermediate addresses by looking up the address translation information and at least a part of the second page tables of the second stage.

13. The processor of claim 11, wherein the second entry of the page table walk scheduler comprises a hazard bit that is marked according to a result of comparing the matching level with the walk cache hit level.

14. The processor of claim 13, wherein a first walker of the plurality of walkers executes a first page table walk to fetch the first intermediate addresses and the first output addresses,
wherein a second walker of the plurality of walkers executes a second page table walk to fetch the second intermediate addresses and the second output addresses, and
wherein, when the redundant walk detector marks the hazard bit, the second page table walk executed by the second walker is canceled.

15. The processor of claim 13, wherein the second entry of the page table walk scheduler further comprises a hazard ID bit indicating a number of a walker which executes fetching the first intermediate addresses and the first output addresses, from among the plurality of walkers.

16. The processor of claim 11, wherein the matching level indicates how much the fourth indexes of each of the second intermediate addresses and the second indexes of each of the first intermediate addresses are matched.

17. A processor, comprising:
a page table walk cache configured to store address translation information; and
a page table walker,
wherein the page table walker is configured to:
fetch first intermediate addresses indicated by first indexes of a first input address by looking up the address translation information and at least a part of first page tables of a first stage and fetch first output addresses indicated by second indexes of each of the first intermediate addresses by looking up the address translation information and at least a part of second page tables of a second stage;
compare a first matching level between third indexes of a second input address and the first indexes of the first input address with a first walk cache hit level obtained by looking up the page table walk cache using the third indexes; and
compare a second matching level between fourth indexes of each of second intermediate addresses indicated by the third indexes of the second input address and the second indexes of each of the first intermediate addresses with a second walk cache hit level obtained by looking up the page table walk cache using the fourth indexes, and
wherein the page table walker comprises:

a page table walk scheduler configured to manage a first entry to which information about a walk request including the first input address is input and a second entry to which information about a walk request including the second input address is input;
a plurality of walkers configured to fetch the first intermediate addresses associated with the first input address and the first output addresses and to fetch the second intermediate addresses associated with the second input address and second output addresses indicated by the fourth indexes of each of the second intermediate addresses;
a first redundant walk detector configured to compare the first matching level with the first walk cache hit level; and
a second redundant walk detector configured to compare the second matching level with the second walk cache hit level.

* * * * *